United States Patent
Suzuki et al.

(10) Patent No.: US 6,493,774 B2
(45) Date of Patent: Dec. 10, 2002

(54) DATA PROCESSING SYSTEM AND MICROCOMPUTER

(75) Inventors: Takaaki Suzuki, Higashimurayama; Tomoya Takasuga, Kodaira; Atsushi Hasegawa, Hamura, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/776,892

(22) Filed: Feb. 6, 2001

(65) Prior Publication Data

US 2001/0010062 A1 Jul. 26, 2001

Related U.S. Application Data

(63) Continuation of application No. 09/186,075, filed on Nov. 5, 1998.

(30) Foreign Application Priority Data

Nov. 6, 1997 (JP) ............................................. 9-303866

(51) Int. Cl.[7] ............................................. G06F 13/00
(52) U.S. Cl. ........................................ 710/100; 710/22
(58) Field of Search ............................. 710/22, 26, 27, 710/28, 36, 31, 107, 100, 113, 240, 241

(56) References Cited

U.S. PATENT DOCUMENTS

| | | | |
|---|---|---|---|
| 4,245,300 A | * | 1/1981 | Kaufman et al. ............... 710/1 |
| 4,313,160 A | * | 1/1982 | Kaufman et al. ............. 710/23 |
| 4,821,170 A | | 4/1989 | Bernick et al. ............... 710/36 |
| 5,099,417 A | | 3/1992 | Magar et al. |
| 5,349,647 A | | 9/1994 | Freiburg et al. ............. 395/115 |
| 5,426,737 A | | 6/1995 | Jacobs ......................... 710/27 |
| 5,444,855 A | | 8/1995 | Thompson ................... 710/107 |
| 5,497,501 A | | 3/1996 | Kohzono et al. ............. 710/29 |
| 5,535,417 A | | 7/1996 | Baji et al. |
| 5,634,076 A | | 5/1997 | Garde et al. .................. 710/22 |
| 5,724,610 A | | 3/1998 | Han et al. ..................... 710/22 |
| 5,761,533 A | | 6/1998 | Aldereguia et al. .......... 710/25 |
| 5,774,684 A | * | 6/1998 | Haines et al. ............... 710/129 |
| 5,805,778 A | * | 9/1998 | Suzuki ....................... 395/115 |
| 6,038,622 A | * | 3/2000 | Swoboda et al. ............. 710/61 |
| 6,105,082 A | | 8/2000 | Hirai et al. ................... 710/28 |
| 6,119,176 A | * | 9/2000 | Maruyama ................... 710/25 |

* cited by examiner

*Primary Examiner*—Xuan M. Thai
(74) *Attorney, Agent, or Firm*—Antonelli, Terry, Stout & Kraus, LLP

(57) ABSTRACT

An input/output device used as a transfer request source outputs a data transfer set command for specifying each transfer channel, each transfer address, the number of transfers, etc. onto a bus together with a data transfer request without being involving use of the CPU. According to the data transfer set command, data transfer control information is set to direct memory access control means, and DMA transfer is started between the input/output device and a memory designated by the transfer address, for example. When the input/output device used as a data transfer request source desires to perform data transfer without regard to a state of processing by the microcomputer, it can perform data transfer processing with its own timing and the data transfer with the input/output device as a principal base is allowed.

4 Claims, 26 Drawing Sheets

FIG. 4

DTR

| BIT: | 63 | 62 | 61 | 60 | 59 | 58 | 57 | 56 | 55 | 54 | 53 | 52 | 51 | 50 | 49 | 48 |
|---|---|---|---|---|---|---|---|---|---|---|---|---|---|---|---|---|
| | SZ2 | SZ1 | SZ0 | RW | ID1 | ID0 | MD1 | MD0 | CT7 | CT6 | CT5 | CT4 | CT3 | CT2 | CT1 | CT0 |

| BIT: | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|
| | - | - | - | - | - | - | - | - | - | - | - | - | - | - | - | - |

| BIT: | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| | A31 | A30 | A29 | A28 | A27 | A26 | A25 | A24 | A23 | A22 | A21 | A20 | A19 | A18 | A17 | A16 |

| BIT: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | A15 | A14 | A13 | A12 | A11 | A10 | A9 | A8 | A7 | A6 | A5 | A4 | A3 | A2 | A1 | A0 |

DATA PROCESSING SYSTEM AND MICROCOMPUTER

This is a continuation of application Ser. No. 09/186,075, filed Nov. 5, 1998.

BACKGROUND OF THE INVENTION

The present invention relates to a microcomputer having direct memory access control means incorporated therein, peripheral devices electrically connected to the microcomputer, and a data processing system using the microcomputer. The present invention also relates to a technique which is effective for use in a computer system intended to provide multitask-based high-speed operations.

There has recently been a demand for improvements in data throughput in a microcomputer. If the quantity of processed data to be loaded on a CPU (Central Processing Unit) increases, it is difficult to improve the data throughput of the microcomputer. Therefore, an attempt has been made to incorporate a peripheral module for performing data transfer control into a microcomputer in place of the CPU to thereby distribute the burden of data processing on the CPU. As such a peripheral module, a DMAC (Direct Memory Access Controller), for example, is known.

In the conventional microcomputer having a DMAC incorporated therein, the CPU is given the task of initially setting control information (such as transfer addresses, the number of transfers, transfer modes, transfer directions, etc.) necessary for data transfer into the DMAC.

As an example of such a direct memory access controller reference is made to a publication entitled "Configuration and Design of Computer (Last Volume)" published by Nikkei BP corporation, pp. 520–521, Apr. 19, 1996.

SUMMARY OF THE INVENTION

However, according to an investigation carried out by the present inventors, there are cases in which an excessive time is required to initially set the data transfer control information into the DMAC using the CPU, depending on the state of data processing by the CPU or the state of utilization of an external data bus. It has been proven that, in such a consequence, excessive time has been taken for data transfer processing. Therefore, there may be cases in which data transfer cannot be started and ended with the timing required by a data transfer request source. There is also a possibility that, since the CPU is used to set the data transfer control information, the CPU cannot be distributed to other processes during that time, so that the microcomputer will exhibit a reduced data processing performance. This becomes one factor which will reduce the performance of the entire system.

An object of this invention is to provide a microcomputer and a data processing system which are capable of setting data transfer control information without placing a burden on the CPU, thereby to carry out a direct memory access with increased system performance.

Another object of this invention is to provide a microcomputer and a data processing system which are capable of immediately responding to a request made from a data transfer request source to start data transfer based on a direct memory access.

A further object of this invention is to provide a peripheral device which is suitable for the issuance of a data transfer request.

The above and other objects and novel features of the present invention will become more apparent from the description provided in the present specification and from the accompanying drawings.

Typical features of the present invention as disclosed in the present application will be briefly described as follows.

That is, when data transfer is carried out, an input/output device (65), used as a transfer request source, outputs a data transfer set command (DTR) for specifying a data transfer channel, a data transfer address, the number of data transfers, a data transfer mode, a data transfer direction, etc. to a bus (60) together with a data transfer request (TR) without involving the CPU (3). According to the data transfer set command, data transfer control information is set into the direct memory access control means (8, 100) and hence data transfer placed under direct memory access control is started between the input/output device used as the data transfer request source and a memory specified by a transfer address. Thus, when the input/output device used as the data transfer request source desires to perform a data transfer, the input/output device can carry out data transfer processing at its own timing without regard to the state of processing of the microcomputer (1), whereby data transfer using the input/output device as a principal part or base can be carried out. Since the CPU is not required to effect the initial setting of the data transfer control information at this time, no load is imposed on the CPU, and the CPU can be distributed to other processes during that time, thereby contributing to an overall improvement in the data processing performance of the microcomputer and the data processing performance of the data processing system.

A data processing system comprises a microcomputer (1), a memory (600), an input/output device (65), and at least one bus (60, 61) commonly connected to the microcomputer, the memory and the input/output device. The microcomputer includes a central processing unit (3), direct memory access control means (8, 100) having a plurality of data transfer channels for performing data transfer control based on data transfer control information supplied from the central processing unit or the outside through the bus, and a bus state controller (5) for arbitrating competition between bus right requests supplied from the central processing unit, the direct memory access control means and the input/output device and for controlling a bus cycle for the bus. The input/output device acquires a bus right to send a data transfer request (TR) to the direct memory access control means and outputs a data transfer set command (DTR) for controlling the operation of the direct memory access control means to the bus, and the input/output device further performs the operation of inputting data to or outputting data from the bus in synchronism with a response (TDACK) corresponding thereto issued from the microcomputer, operating as a data transfer source for the control of the data transfer by the direct memory access control means. The direct memory access control means can execute a first operation (first normal data transfer operation) for performing data transfer control in accordance with the data transfer control information initially set by the data transfer set command.

In the first operation as described above, the input/output device, which makes a request for data transfer, can set data transfer control information and start data transfer control without involving the CPU. Here, the processing of the CPU ranges over various diverse operations. It has been considered that heretofore in the conventional microcomputer when the CPU is performing another processing at the time data transfer control information is to be set to the direct memory access control means, the processing of the CPU must be allowed to continue until the other process is ended or be interrupted by or through the issuing of an interruption or the like, so that an extended time is often required to set a data transfer control condition. It is estimated that since the timing for the start and end of data transfer is not taken, an influence will be exerted on the performance even upon the construction of a system. However, in accordance with this invention, owing to the direct setting of the data transfer control information by the input/output device without involving the CPU, as described above, the data transfer can be started regardless of the state of processing of the CPU, whereby the data transfer processing performance can be improved and the data transfer processing time can be shortened.

After the first operation, the direct memory access control means detects that the data transfer set command (DTR) supplied together with the data transfer request (TR) from the input/output device has been placed in a specific first state (MD1, MD0="0, 0"), thereby making it possible to execute a second operation (first handshake protocol transfer operation) for performing data transfer control according to the initially set data transfer control information, using the same data transfer channel as that used for the first operation. A data transfer request at the time, in which it is unnecessary to change the initialization condition, can be simply made.

After the first operation or the second operation, the direct memory access control means is supplied with a data transfer request (TR) from the input/output device without the delivery of the data transfer set command, thereby making it possible to execute a third operation (second handshake protocol transfer operation) for performing data transfer control according to the initially set data transfer control information, using the same data transfer channel as that used for the immediately preceding data transfer operation. Since, in this case, the immediately preceding data transfer channel and the data transfer control information are used for data transfer, the input/output device can start the data transfer, even if it is not able to acquire a bus right to set such information.

Further, the direct memory access control means is supplied with the data transfer request (TR) from the input/output device with the data transfer set command (DTR) after the data transfer control information has been initialized by the CPU, thereby making it possible to execute a fourth operation (second normal data transfer operation) for performing data transfer control according to the data transfer control information initialized by the CPU, using a data transfer channel specified by the data transfer set command. The input/output device itself can start up the data transfer even by using the state of initialization by the CPU.

After the data transfer control information has been initially set by the CPU, the direct memory access control means is supplied with a data transfer request (TR) from the input/output device without the delivery of the data transfer set command, thereby making it possible to execute a fifth operation (third normal data transfer operation) for performing data transfer control according to the initially set data transfer control information, using the same data transfer channel as that used for the immediately preceding data transfer operation. Since the previously set data transfer control information is used in this case, the input/output device can start data transfer without acquiring a bus right.

The direct memory access control means detects that a data transfer set command supplied from the input/output device is placed in a specific second state (ID1, ID0="0, 0", MD1, MD0="0, 0" and SZ2, SZ1, SZ0="1, 1, 1"), thereby making it possible to force-complete a data transfer control operation. Thus, when data transfer is required, the input/output device can stop the data transfer operation of the already-activated direct memory access control means and request a data transfer with the highest priority.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description, when taken in connection with the accompanying drawings, in which:

FIG. 4 is a diagram showing a command format illustrative of one example of a data transfer set command;

DESCRIPTION OF THE PREFERRED EMBODIMENTS

In order to facilitate an understanding of the present invention, a description will first be made here of the outline of operations performed by an external input/output device (external I/O) when a data transfer request origin or source principally sets data transfer control information into a DMAC and requests the DMAC to perform data transfer, in relation to a microcomputer and an overall data processing system. Afterwards, their functions (data transfer setting functions based on the external I/O) will be described in detail.

<<Microcomputer>>

Figure 2:
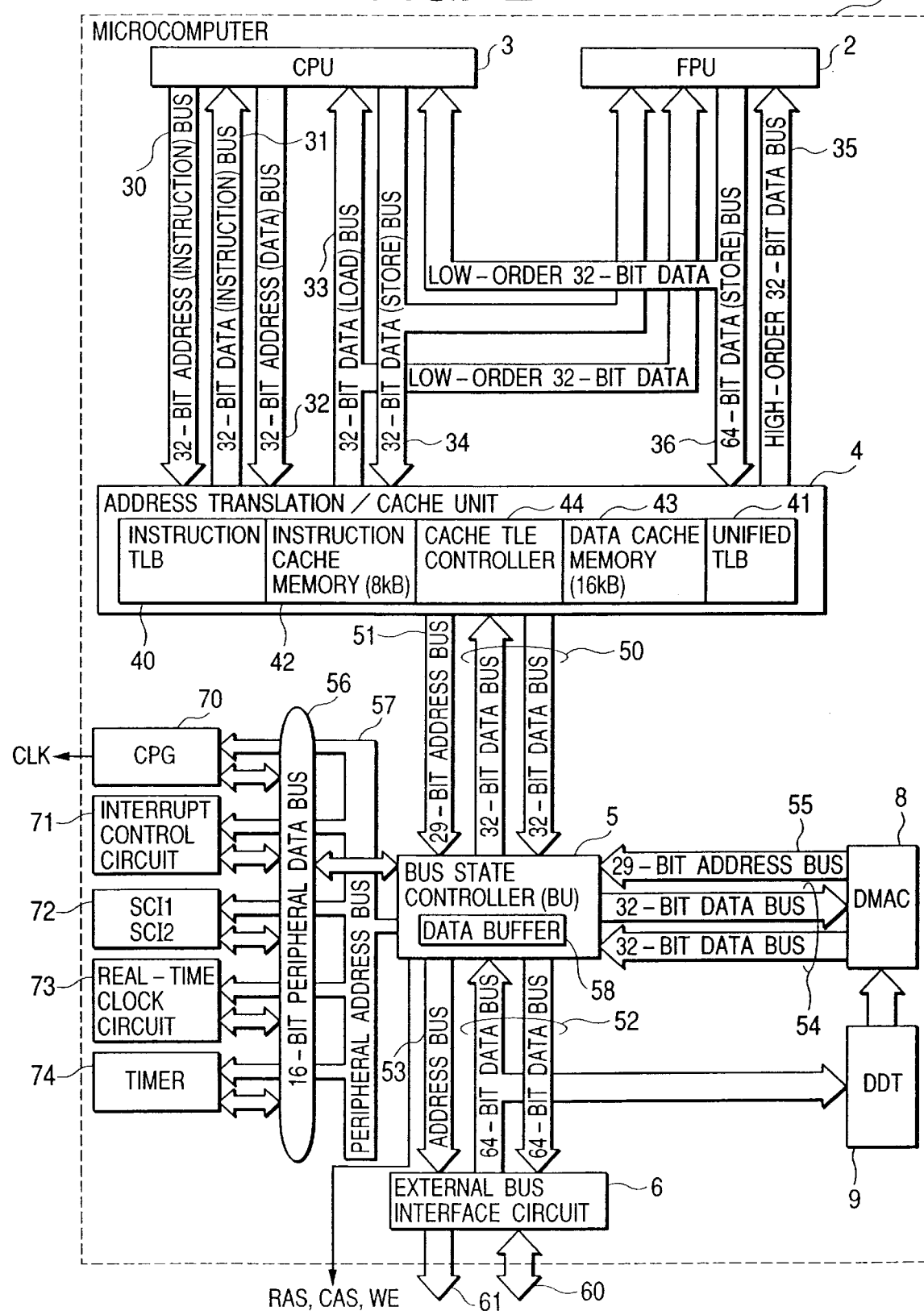
FIG. 2 is a block diagram illustrating a microcomputer according to one embodiment of the present invention.

FIG. 2 shows a microcomputer according to one embodiment of the present invention. Although the invention is not restricted in particular, the microcomputer 1 shown in the drawing is constructed of integrated circuits on a single semiconductor substrate, like monocrystalline silicon. The microcomputer 1 has a floating point unit (also called "FPU") 2. Further, the microcomputer 1 is provided with a central processing unit (also called "CPU") 3 capable of operating on integers. Although the invention is not limited in particular, the microcomputer 1 has a 32-bit RISC (Reduced Instruction Set Computer) architecture provided with a 16-bit fixed length instruction set.

Designated by numeral 4 in FIG. 2 is an address translation/cache unit. The address translation/cache unit 4 has an instruction address translation buffer (also called "instruction TLB") 40 for instructions and a separately provided data unified address translation buffer (also called "unified TLB") 41; so that an instruction access and a data access can be executed by the CPU 3 in parallel. Further, an instruction cache memory 42 and a data cache memory 43 are individually provided. A cache/address translation buffer controller (also called "cache TLB controller") 44 controls the address translation/cache unit 4 as a whole.

Designated by numeral 5 in FIG. 2 is a bus state controller (bus controller), which is electrically connected to the address translation/cache unit 4 through a pair of 32-bit data buses 50 and a 29-bit address bus. 51. A DMAC 8 is electrically connected to the bus state controller 5 through a pair of 32-bit data buses 54 and an address bus 55.

The setting of data transfer control information into the DMAC 8 can be performed either by the CPU 3 or from the outside of the microcomputer 1 through a DDT 100. The DDT 100 is a bridge circuit for supplying the data transfer control information or the like. supplied from the outside of the microcomputer 1 to the DMAC 8.

In the microcomputer 1, the CPU 3 and the DMAC 8 constitute a bus master module. An external access of the microcomputer 1 is performed by an external bus interface circuit 6 electrically connected to the bus state controller 5 through a 64-bit data bus 52 and an address bus 53. The external bus interface circuit 6 is electrically connected to an external data bus 60 and an external address bus 61. Further, the bus state controller 5 outputs strobe signals RAS, CAS and a write enable signal WE or the like to an externally-provided memory.

The microcomputer 1 has a clock pulse generator (also called "CPG") 70, an interrupt control circuit 71, a serial communication interface controller (SCI1, SCI2) 72, a real-time clock circuit 73 and a timer 74 as built-in peripheral circuits electrically connected to a 16-bit peripheral data bus 56 and a peripheral address bus 57. These peripheral circuits may be accessed by the CPU 3 or by DMAC 8 through the bus state controller 5. Further, a clock signal CLK synchronized with a system clock is outputted from the clock pulse generator 70. The microcomputer 1 takes in or captures data from the outside, for example, in synchronism with the system clock signal CLK.

The bus state controller 5 makes a decision as to an access data size, an access time and a wait state according to the circuit to be accessed (corresponding to an address area to be accessed) by the CPU 3 or by the DMAC 8 and controls bus accesses to the peripheral buses 56 and 57 and the external buses 60 and 61. Further, the bus state controller 5 arbitrates competition between bus use requests issued from the cache TLB controller 44, the DMAC 8 and the outside. A data buffer 58 included in the bus state controller 5 temporarily latches transfer data to accommodate the difference between operation velocities of circuits connected to the internal buses 50 and 51, the peripheral buses 56 and 57 and the external buses 60 and 61. Further, the DMAC 8 transfers data from the data buffer 58 to a transfer destination without capturing the data latched in the data buffer 58 under the data transfer control of the DMAC 8. Thus, the transfer of data is performed so as to avoid the needless transfer of data between the DMAC 8 and the data buffer 58.

The CPU 3 outputs an instruction address to a 32-bit instruction address bus 30 when it fetches instructions, and fetches instructions outputted to the instruction data bus 31. Further, the CPU 3 outputs a data address to a 32-bit data address bus 32, and reads (loads) data through a 32-bit data bus 33 and writes (stores) data through a 32-bit data bus 34. The instruction address and the data address are both logical addresses.

Although the invention is not restricted in particular, the FPU 2 is not provided with a memory addressing capability for accessing the data cache memory 43 or the like. The CPU 3 performs all addressing operations for accessing data in place of the FPU 2. In this way, the need for the provision of a memory address circuit in the FPU 2 is eliminated so as to economize on the chip area. The loading of data into the FPU 2 is performed through the 32-bit data bus 33 and a 32-bit data bus 35, whereas the storing of data from the FPU 2 is carried out through a 64-bit data bus 36. The transfer of data from the FPU 2 to the CPU 3 is performed using the low-order 32 bits of the 64-bit data bus 36.

The CPU 3 fetches not only data for the FPU 2. but also all the instructions, including floating point instructions for the FPU 2. A floating point instruction fetched by the CPU 3 is supplied from the CPU 3 to the FPU 2 via the 32-bit data bus 34.

Although the invention is not limited in particular, the microcomputer 1 handles a virtual address space defined by a 32-bit virtual address and a physical address space defined by a 29-bit physical address. Address translation information for converting a virtual address to a physical address includes a virtual page number and a physical page number corresponding thereto. An address translation table is formed in an unillustrated external memory of the microcomputer 1. of address translation information in the address translation table provided within the external memory not shown in the drawing, the most-recently-used address translation information is stored in the instruction TLB 40 and the unified TLB 41. The required control is performed by an operating system of the microcomputer 1, for example.

The unified TLB 41 for the data stores therein address translation information about data and instructions in the form of 64 entries at a maximum. The unified TLB 41 associatively retrieves a physical page number corresponding to a virtual page number of a virtual address outputted to the data address bus 32 by the CPU 3 for purposes of a data fetch from the address translation information and translates the virtual address to a physical address.

The instruction TLB 40 for the instructions stores therein instruction-dedicated address translation information in the form of 4 entries at a maximum. In particular, the entries held by the instruction TLB 40 are defined as some of the address translation information relating to instruction addresses held by the unified TLB 41. That is, when it is found from the associative retrieval that no intended address translation information exists in the instruction TLB 40, this address translation information is supplied from the unified TLB 41 to the instruction TLB 40. The instruction TLB 40 associatively retrieves a physical page number corresponding to a virtual page number of a virtual address outputted to the instruction address bus 30 by the CPU 3 for purposes of an instruction fetch from address translation information. When the intended address translation information exists (TLB hit), the corresponding virtual address is converted to a physical address using the intended address translation information. When no intended address translation information exists therein (TLB miss), the cache TLB controller 44 controls the operation for obtaining the intended address translation information from the unified TLB 41.

The data cache memory 43 receives the physical address converted by the unified TLB 41 for a data fetch and performs cache-entry associative retrieval based on the physical address. If the result of retrieval is found to be a read hit, then data corresponding to the physical address is outputted to the data bus 33 or 35 through a cache line related to the hit. If the result of retrieval is found to be a read miss, then data corresponding to one cache line including data related to its miss is read from the unillustrated external memory through the bus controller 5 to perform a cachefill operation. Thus, the data related to the cache miss is read onto the bus 33 or 35. If the result of retrieval is found to be a write hit, then data is written into a hit entry if a cache operation mode is a copyback mode and a dirty bit for the corresponding entry is set. The state of mismatching with the data of the external memory is found from the dirty bit placed in the set state. When the corresponding dirty cache entry is expelled from the cache memory by the cachefill operation, data is written back to the external memory. In a write-through mode, data is written into the hit entry and the writing of data to the external memory is also performed together. If the result of retrieval is found to be a write miss, then a cachefill operation is performed in the case of the copyback mode, and a dirty bit is set to update a tag address, after which data is written into a cache line subjected to the cachefill operation. In the case of the write-through mode, data is written into the external memory alone.

The instruction cache memory 42 receives the physical address converted by the instruction TLB 40 for an instruction fetch and associatively retrieves a cache entry, based on the physical address. If the result of retrieval is found to be a read hit, then an instruction corresponding to the physical address is outputted to the instruction data bus 31 from a cache line related to the hit. If the result of retrieval is found to be a read miss, then data corresponding to one cache line including an instruction related to the miss is read from the unillustrated external memory through the bus controller 5, whereby a cachefill operation is performed. Thus, the instruction related to the miss is supplied to the CPU 3 through the instruction data bus 31.

The instruction TLB 40, the unified TLB 41 and the cache TLB controller 44 constitute a memory management unit. The memory management unit can set the right to have access to a virtual address space and perform memory protection in a privileged mode and a user mode. For example, address translation information has protection key data for each virtual address page number. The protection key data is 2-bit data obtained by representing page access rights in the form of codes. Any of the access rights capable of reading in the privileged mode, reading and writing in the privileged mode, reading in both the privileged and user modes, and reading and writing in both the privileged and user modes can be set. When an actual access type infringes on the access rights set by the protection key data, a TLB protection infringement exception is generated. When the TLB protection infringement exception occurs, the protection infringement is solved by an exception process and thereafter a return instruction from the exception process is executed to re-execute the interrupted normal process instruction.

<<Data Processing System>>

Figure 1:
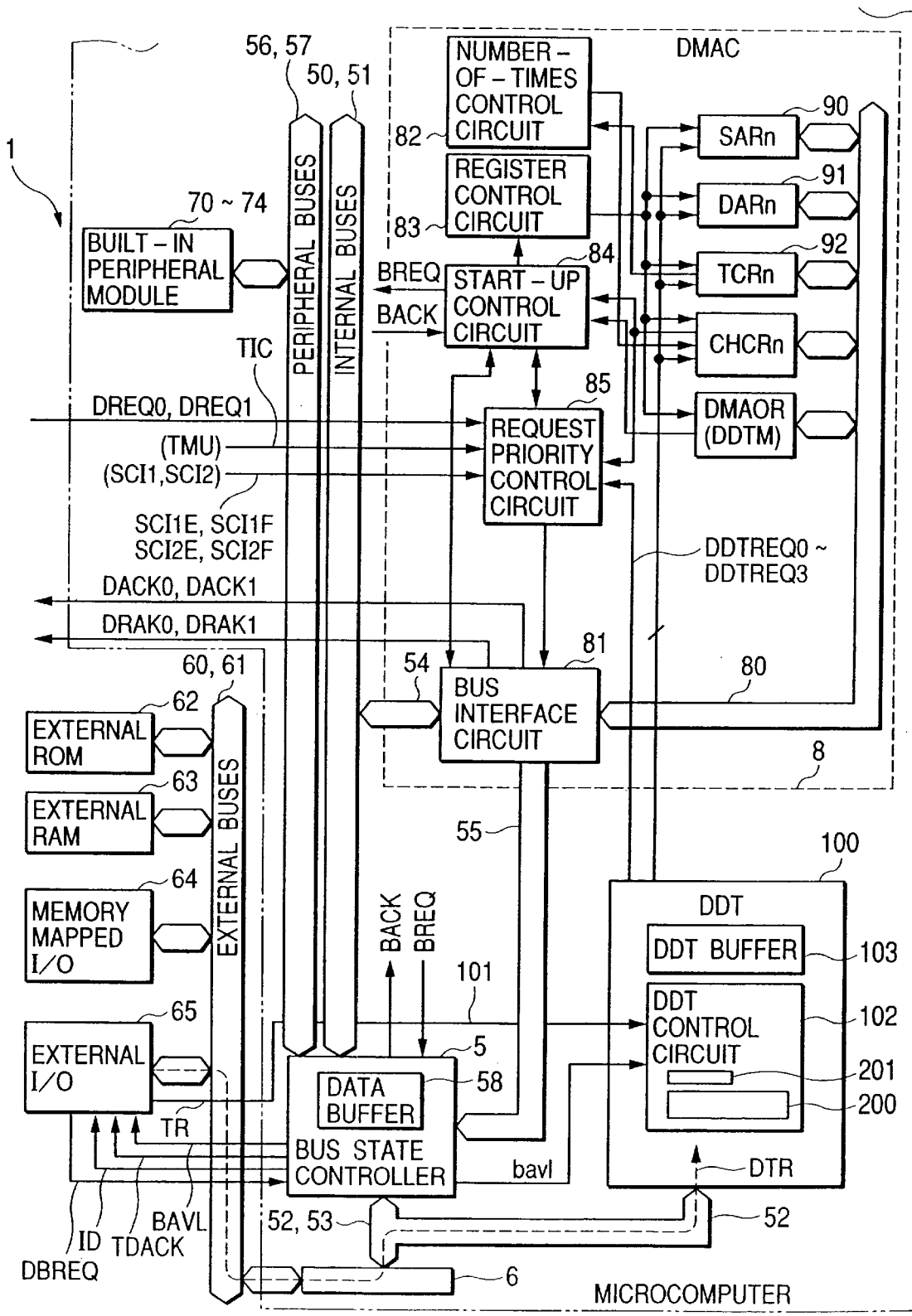
FIG. 1 is a block diagram showing a data processing system according to one embodiment of the present invention.

FIG. 1 shows one example of a data processing system together with the details of the DMAC 8. In FIG. 1, the peripheral data bus 56 and the peripheral address bus 57 are indicated generically as "peripheral buses", the address buses 50 and the data bus 51 are indicated generically as "internal buses", and the external data bus 60 and the external address bus 61 are indicated generically as "external buses". Further, the circuits designated at numerals 70 through 74 are identified generically as built-in peripheral modules (built-in peripheral circuits).

Although the invention is not limited in particular, an external ROM (Read Only Memory) 62 in which programs, constant data, etc. are stored, an external RAM (Random Access Memory) 63 used as a main memory or the like, a memory mapped I/O (Input/Output) 64, and an external input/output device 65 (corresponding to an external I/O with acknowledgment) having a storage area which eliminates the need for specifying or designating each address from the outside, as in the case of an FIFO (First In First Out) buffer or the like, are typically coupled to the external buses 60 and 61 as external peripheral circuits. The external I/O 65 is a device for performing the operation of inputting or outputting data as a data transfer request origin or source in a single addressing mode of the DMAC 8. The external I/O 65 serves as a semiconductor device, such as a communication I/O, a protocol control I/O or the like. The external I/O 65 has the function of acquiring a bus right and outputting a data transfer set command to the external bus 60 and initially sets data transfer control information to the DMAC 8 through the DDT 100. Further, the external I/O 65 has the function of requesting the DMAC 8 to transfer data.

The DMAC 8 has four data transfer channels (data transfer channels 0 to 3) comprising n=0, 1, 2 and 3, for example, and includes a source address register unit 90 including source address registers SARn to which transfer source addresses are set for each of the data transfer channels, a destination address register unit 91 including destination address registers DARN to which transfer destination addresses are set for each of the data transfer channels, a transfer count register unit 92 including transfer count registers TCRn for counting the number of times that data is transferred for each of the data transfer channels, and a channel control register unit CHCRn to which a data transfer control state or the like is set for each of the data transfer channels. A data transfer channel is a functional unit for handling the transfer of data between storage devices, the transfer of data between a storage device and peripheral circuits or the transfer of data between peripheral circuits. An operation register DMAOR common to the respective data transfer channels is further provided.

The respective registers SARn, DARn, TCRn, CHCRn and DMAOR are commonly connected to a bus 80. The bus 80 is electrically connected to a bus interface circuit 81. The bus interface circuit 81 is electrically connected to the internal bus 51 through the data bus 54 and it is also connected to the bus state controller 5 through the address bus 55. While the data bus 54 is shown as being electrically connected to the internal bus 51 to facilitate illustration in the drawing, the data bus 54 actually is electrically connected to the internal bus 51 through the bus state controller 5, as described previously with reference to FIG. 2.

The data bus 54 is used for a read/write operation for allowing the CPU 3 to initially set data transfer control information into the registers SARn, DARn, TCRn, CHCRn and DMAOR and to confirm the contents of its setting. The read/write operation is performed by the CPU 3 through the address translation/cache unit 4. A signal for selecting each register referred to above is supplied via the internal bus 51 and the data bus 54.

The setting of the data transfer control information into the registers SARn, DARn, TCRn and CHCRn also may be performed from the outside of the microcomputer 1 through the DDT 100. In the example illustrated in FIG. 1, the main element used for its setting corresponds to the external I/O 65. The external I/O 65 allows the bus controller 5 to assert a bus use request signal DBREQ, so that a bus use approval signal BAVL is asserted from the bus controller 5, thereby obtaining a bus right. Thereafter, the external I/O 65 outputs a data transfer set command DTR to the external bus 60. The data transfer set command DTR is supplied to the DDT 100 so that information included in the data transfer set command DTR is supplied to the registers SARn, DARn, TCRn and CHCRn through a DDT control circuit and a DDT buffer as data transfer control information.

The address bus 55 is used to allow the DMAC 8 to supply an access address signal to the built-in peripheral circuits and the external peripheral circuits through the bus state controller 5 during a data transfer operation. The bus interface circuit 81 supplies instructions for a read or write operation, under the data transfer control of the DMAC 8, to the bus state controller 5. The bus state controller 5 determines the potential of the write enable signal WE in accordance with the instructions issued from the bus interface circuit 81.

The DMAC 8 has a number-of-times control circuit 82, a register control circuit 83, start-up control circuit 84 and a request priority control circuit 85 as control circuits used for data transfer control using the data transfer channels. When data transfer requests are made from the inside and outside of the microcomputer 1, the request priority control circuit 85 refers to channel enable bits or the like of the channel control registers CHCRN to determine, in response to the data transfer requests, whether a data transfer channel to be started up or activated is capable of operation. Further, when data transfer requests compete with each other, the request priority control circuit 85 determines one data transfer channel to be started up, in accordance with a predetermined precedence. When the request priority control circuit 85 has determined one data transfer channel to respond to the corresponding data transfer request, it supplies information on the data transfer channel to the start-up control circuit 84. The start-up control circuit 84 first issues to the bus state controller 5 a bus right request signal BREQ so as to demand a bus right. When a bus right acknowledgment signal BACK is asserted by the bus state controller 5, the DMAC 8 acquires a bus right. Further, the start-up control circuit 84 allows the register control circuit 83 to control output operations or the like of the source registers SARn and destination registers DARn and causes the bus interface circuit 81 to control an address output operation or the like. Thus, the DMAC 8 performs data transfer control responsive to the data transfer requests through the bus state controller 5. The bus state controller 5 starts up a bus cycle on the basis of the number of memory cycles corresponding to the address area for the address signal supplied from the DMAC 8.

Although the invention is not restricted in particular, the data transfer requests made from the built-in peripheral circuits of the microcomputer 1 are given by an input capture interrupt signal TIC outputted from the timer (TMU) 74, a transmit data empty interrupt transfer request signal SCI1E outputted from a serial communication interface controller SCI1L, a receive data full interrupt transfer request signal SCI1F outputted from the serial communication interface controller SCIL, a transmit data empty interrupt transfer request signal SCI2E outputted from a serial communication interface controller SCI2, and a receive data full interrupt transfer request signal SCI2F outputted from the serial communication interface controller SCI2.

The data transfer requests (external requests) made to the DMAC 8 from the outside of the microcomputer 1 are first given by transfer request signals DREQ0 and DREQ1. Although the invention is not limited in particular, the external requests are made effective or valid by data transfer channels 0 and 1 alone. When the transfer requests based on the transfer request signals DREQ0 and DREQ1 are accepted, transfer acknowledgment signals DRAK0 and DRAK1 are sent back to each transfer request source. The completion of data transfer operations responsive to the transfer request signals DREQ0 and DREQ1 is sent back to the transfer request sources in accordance with transfer completion signals DACK0 and DACK1.

Figure 12:
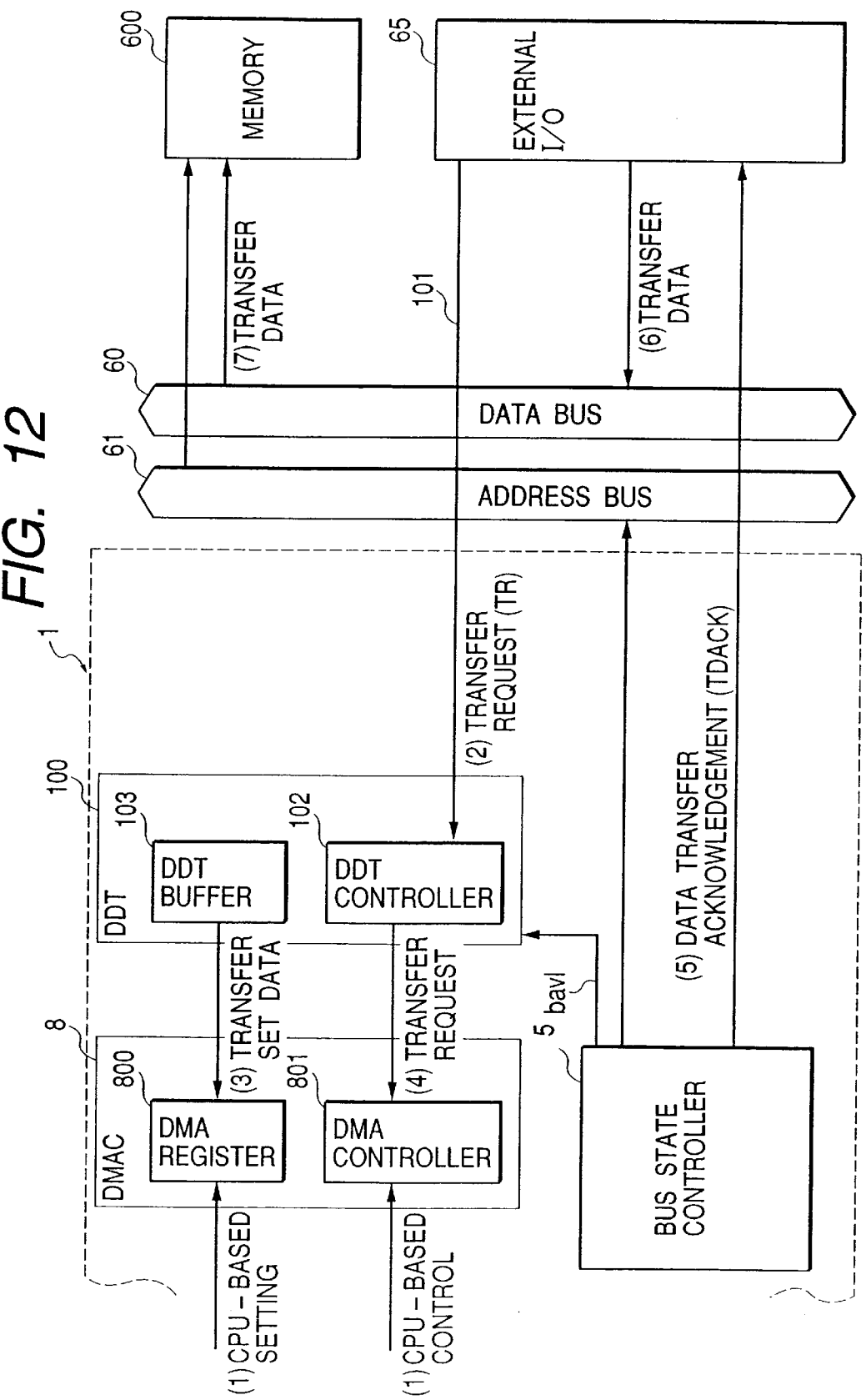
FIG. 12 is a diagram for describing a third normal data transfer operation with the transfer of data from an external I/O to a memory as an example.
Figure 13:
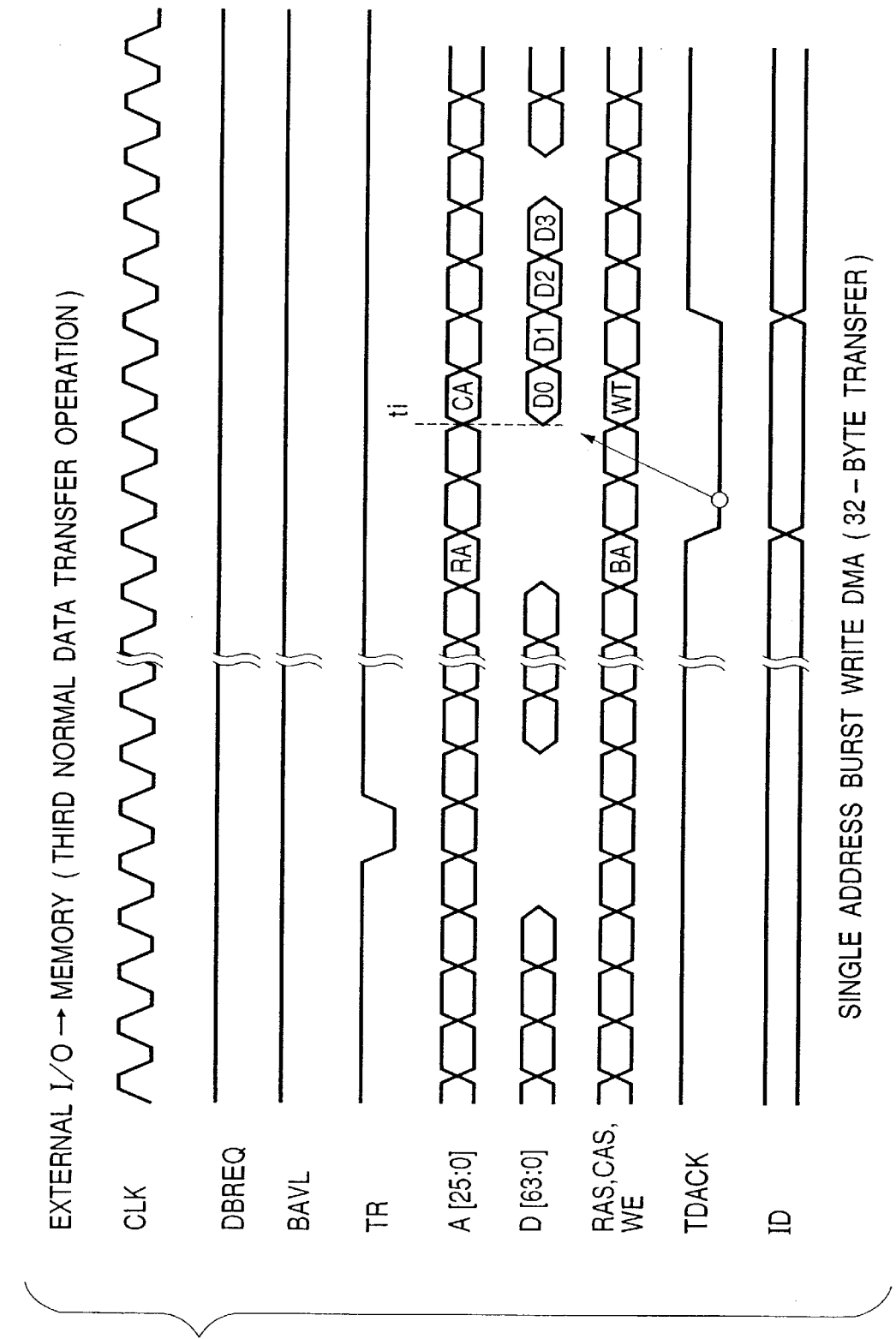
FIG. 13 is a timing chart concerning the transfer of data from the external I/O to the memory under the third normal data transfer operation.
Figure 14:
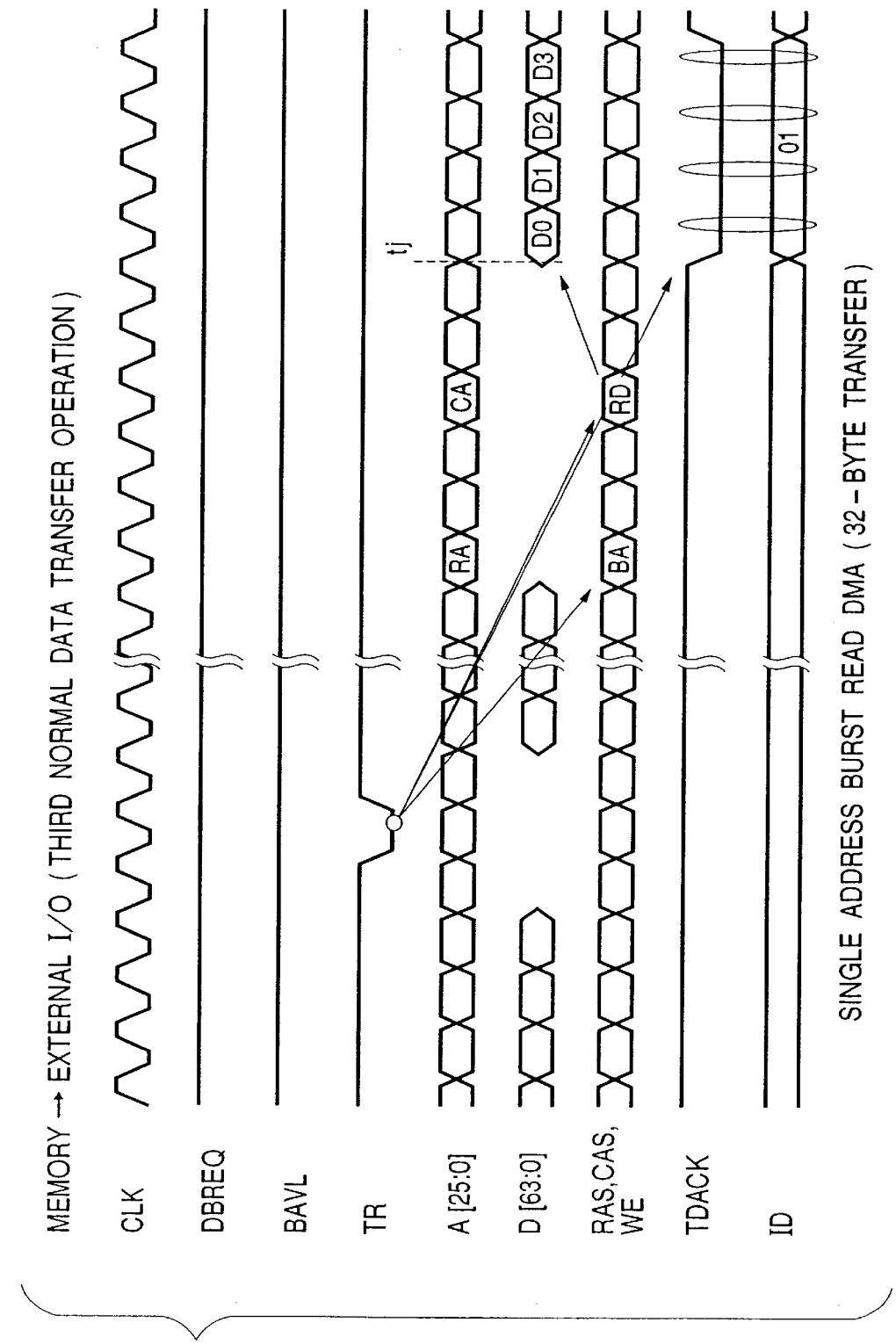
FIG. 14 is a timing chart concerning the transfer of data from the memory to the external I/O under the third normal data transfer operation.

The external I/O 65 can secondly make the external requests through a transfer request signal TR and a data transfer control set command DTR. The transfer request signal TR is supplied to the DDT 100 through a dedicated signal line 101. A data transfer channel to be started up at this time is determined according to the contents of the signal and data transfer set command DTR outputted from the external I/O 65 together with the transfer request signal TR, and control thereof is performed by a DDT control circuit 102. Reference numeral 200 in the DDT control circuit 102 indicates a buffer for holding a data transfer set command DTR. The buffer holds the previously-supplied data transfer set command DTR therein until the next new data transfer set command DTR is supplied thereto. Reference numeral 201 indicates a decoder for decoding a specific bit of the data transfer set command DTR held in the buffer 200. The specific bit is a bit indicative of a data transfer channel in the data transfer set command DTR, for example. Since the data transfer set command DTR is held in the buffer 200, a data transfer channel to be started up can be determined by referring to the data transfer set command DTR held in the buffer 200 when a third normal data transfer operation to be described subsequently by reference to FIGS. 12 through 14 is specified. For example, the decoder 201 can determine a data transfer channel to be started up upon the third normal data transfer operation by decoding a bit (corresponding to a bit for designating a data transfer channel) in the data transfer set command DTR held in the buffer 200. Without providing the buffer 200, a DDT buffer 103 may be used in place of the buffer 200. That is, since a data transfer set command DTR is held in the DDT buffer 103 as will be described later using FIG. 5, the DDT buffer 103 may be utilized in place of the buffer 200.

<<Data Transfer Setting Function by External I/O>>

Figure 3:
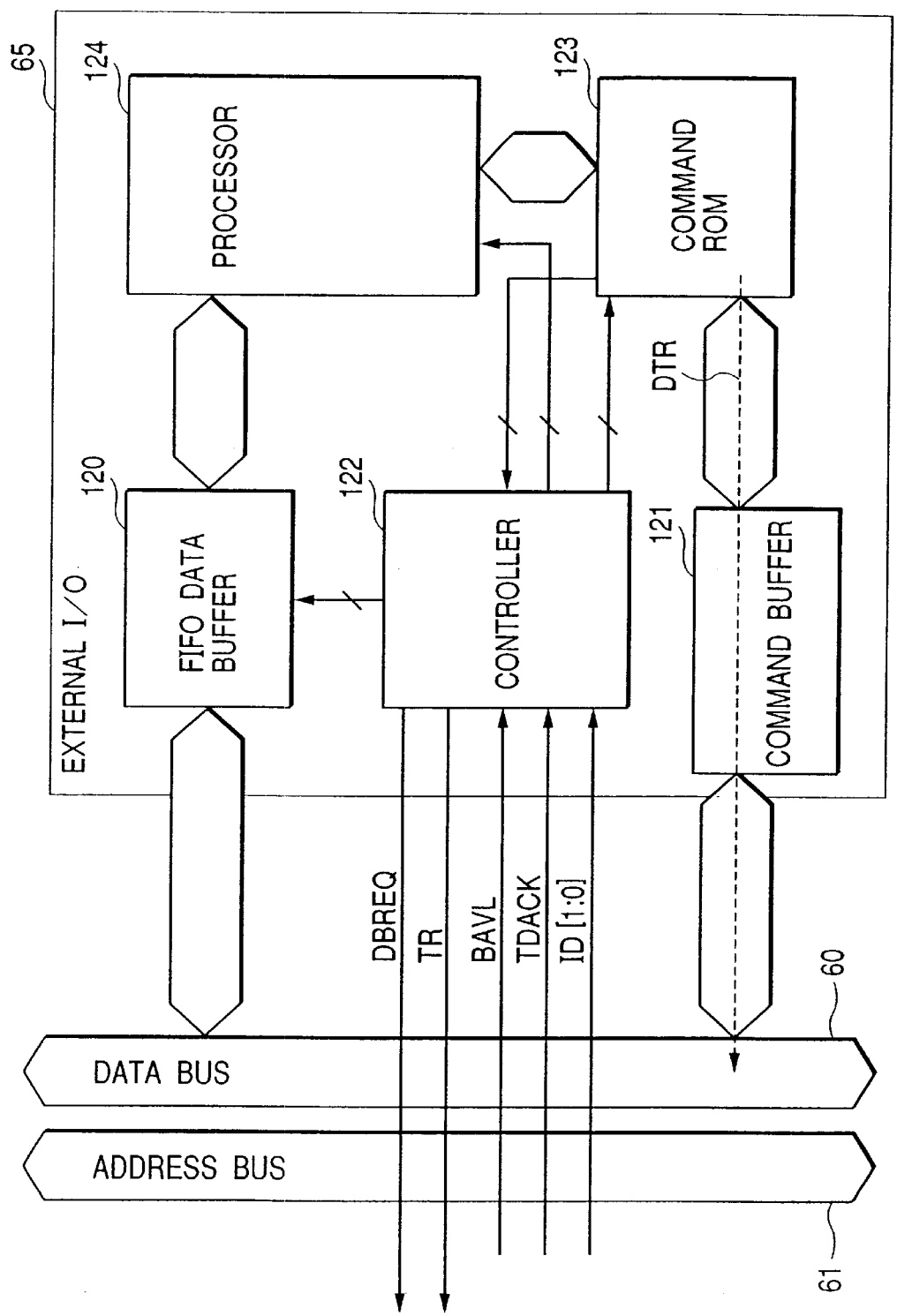
FIG. 3 is block diagram depicting one example of an external I/O.

FIG. 3 shows one example of the external I/O 65. Although the invention is not restricted in particular, the external I/O 65 has an FIFO data buffer 120, a command output buffer 121, a controller 122, a command ROM 123, and a processor 124. The processor 124 has functions, such as a communication control function, an image processing function, a voice processing function, etc., which are not subject to any restrictions. The input of data from the bus 60 to the processor 124 and the output of data from the processor 124 to the bus 60 are performed via the FIFO data buffer 120. The controller 122 controls the external I/O 65 as a whole. The command ROM 123 holds a data transfer set command DTR therein in advance. The controller 122 obtains access to the command ROM 123 to internally transfer a predetermined data transfer set command DTR to the command buffer 121, so that the data transfer set command DTR of the command buffer 121 is outputted to the external data bus 60 with a timing designated or specified by the controller 122.

The controller 122 outputs a bus use request signal DBREQ and a transfer request signal TR, both shown typically, and inputs a bus use approval signal BAVL, a data strobe signal TDACK and a channel identification signal ID therein. The signals DBREQ, TR, BAVL and TDACK are set as low enable signals. Incidentally, other interface signals corresponding to other functions of the processor 124 are omitted from the drawing.

Under the data transfer control of the DMAC 8, the external I/O 65 serves as a device set as a data transfer source or destination in a single addressing mode without performing addressing based on an address signal. The data strobe signal TDACK is regarded as a signal for designating or specifying a timing provided to perform the operation of inputting or outputting data to or from the external I/O 65 in the single addressing mode by—the DMAC 8. It is needless to say that the external I/O 65, which serves as the data transfer request source for the DMAC 8, recognizes whether the external I/O 65 performs either a data input operation or a data output operation. The channel identification signal ID is a signal which permits the identification of a data transfer channel through which the DMAC 8 is performing data transfer control.

FIG. 4 shows one example of the data transfer set command DTR. Although the invention is not restricted in particular, the data transfer set command is set to 64 bits and has command formats which respectively hold transfer size data SZ2 through SZ0, read/write data (data indicative of read or write) RW, data transfer request channel data ID1 and ID0, data transfer request mode data MD1 and MD0, data transfer number-of-times data CT7 through CT0, and data transfer addresses A31 through A0. Although the invention is not limited in particular, the data transfer set command is 64 bits in the present embodiment and is set to be the same as the bus size of the external data bus 60. Therefore, the command can be supplied from the external I/O to the microcomputer with one data transfer, and the data transfer operation can be speeded up. Of course, the data transfer set command DTR is divided into parts, which may be sequentially supplied to the microcomputer on a time basis.

In the transfer size data SZ2 through SZ0, "000" means a byte (8 bits), "001" means a word (16 bits), "010" means a long word (32 bits), "011" means a quad word (64 bits), "100" means 32 bytes, and "111" means "absence" respectively. Other bits are set as undefined. In the read/write bit RW, "0" means read from a memory and "1" means write to the memory.

The data transfer request channel bits ID1 and ID0 identify data transfer requests with respect to a data transfer channel 0 at "00", a data transfer channel 1 at "01", a data transfer channel 2 at "10", and a data transfer channel 3 at "11".

The MD1 and MD0 are bits used to designate a transfer operation mode for the DMAC 8. "00" means a handshake protocol using a data bus, "01" means edge sense, "10" means level sense, and "11" means cycle steal respectively. Incidentally, the operation mode required of the DMAC 8 by the external I/O 65 will not be determined by the data transfer set command alone. As will be apparent from the subsequent description, the operation mode is determined in relation even to the states of signals such as the transfer request signal TR, etc.

Figure 5:
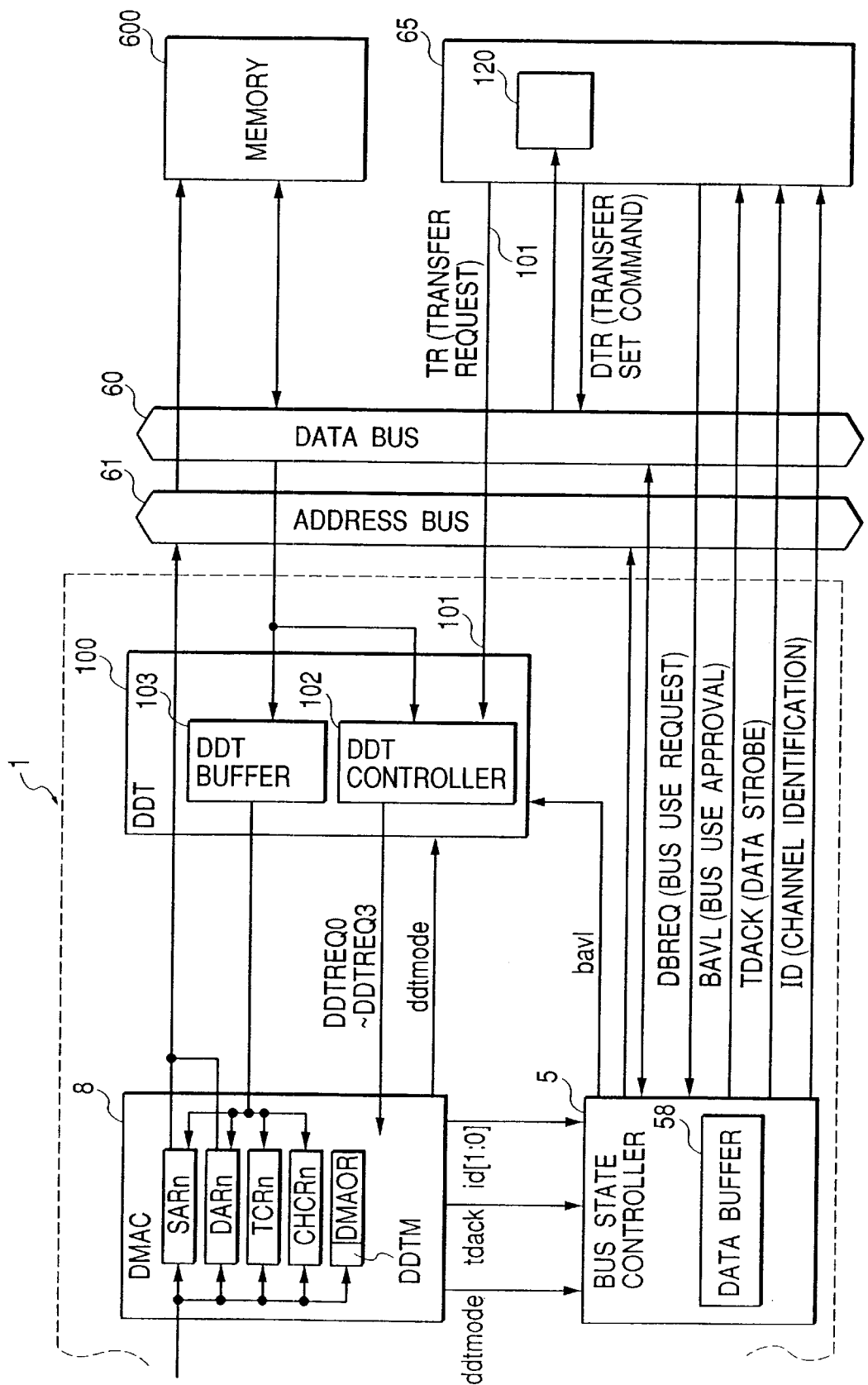
FIG. 5 is a schematic block diagram illustrating a relationship of connections between a DMAC, a DDT, a bus state controller, a memory and an external I/O.

FIG. 5 shows in detail the relationship between the DMAC 8, the DDT 100, the bus state controller 5, the external ROM 62 and the RAM 63 referred to generically as a memory 600, and the external I/O 65 employed in the data processing system illustrated in FIG. 1. The buses 52 and 53 and external bus interface circuit 6 provided inside the microcomputer 1 are omitted from the drawing to facilitate the understanding of the drawing. Although the DDT 100 and the bus controller 5 are illustrated as if they directly interface with the external buses 60 and 61, it is to be understood that the relationship provided by the connections shown in FIG. 1 is actually maintained.

The operation register DMAOR of the DMAC 8 has a control bit DDTM initially set by the CPU 3. The control bit DDTM indicates whether the data transfer control is to be provided by the DDT 100, in other words, whether the principal setting or the like of data transfer control information from the external I/O 65 should be allowed. The value of the control bit DDTM is supplied to the bus controller 5 and the DDT 100 through a control signal ddtmode. Thus, when the data transfer control using the DDT 100 is allowed, the DDT 100 is made operable and the bus controller 5 is able to output a bus use approval signal BAVL and a data strobe signal TDACK in response to a bus use request based on a signal DBREQ. When the bus use approval signal BAVL is asserted, the bus controller 5 allows the DDT 100 to assert a signal bavl. Thus, the DDT 100 can recognize that the external I/O 65 has acquired a bus right.

The DDT buffer 103 in the DDT 100 inputs and holds a data transfer set command DTR therein. The DDT controller 102 controls the setting of data transfer control information to the DMAC 8 and the start-up of a DMA transfer operation in accordance with the contents of the supplied data transfer set command .DTR, the state of a transfer request signal TR, etc. When it is necessary to set the data transfer control information to the registers SARn, DARn and CHCRn, data transfer channels designated by the data transfer request channel data ID1 and ID0 included in the data transfer set command DTR are specified and pieces of information about the commands in command formats are supplied to the corresponding registers SARn, DARn and CHCRn in accordance with the command formats. A request for the start-up of the data transfer operation is performed using request signals DDTREQ0 through DDTREQ3 for every one of the data transfer channels.

Upon carrying out the data transfer control, the DMAC 8 outputs a signal id for indicating a data transfer channel to be activated, and a strobe signal tdack for indicating the start of data transfer to a data transfer source in a single addressing mode. The signals id and tdack are set as control signals ID and TDACK through the bus controller 5 and are supplied to the external I/O 65.

While the setting of the data transfer control information to the respective registers has been described using FIG. 5, etc., an additional description will be made using FIG. 26 to facilitate further understanding of the invention.

Figure 26:
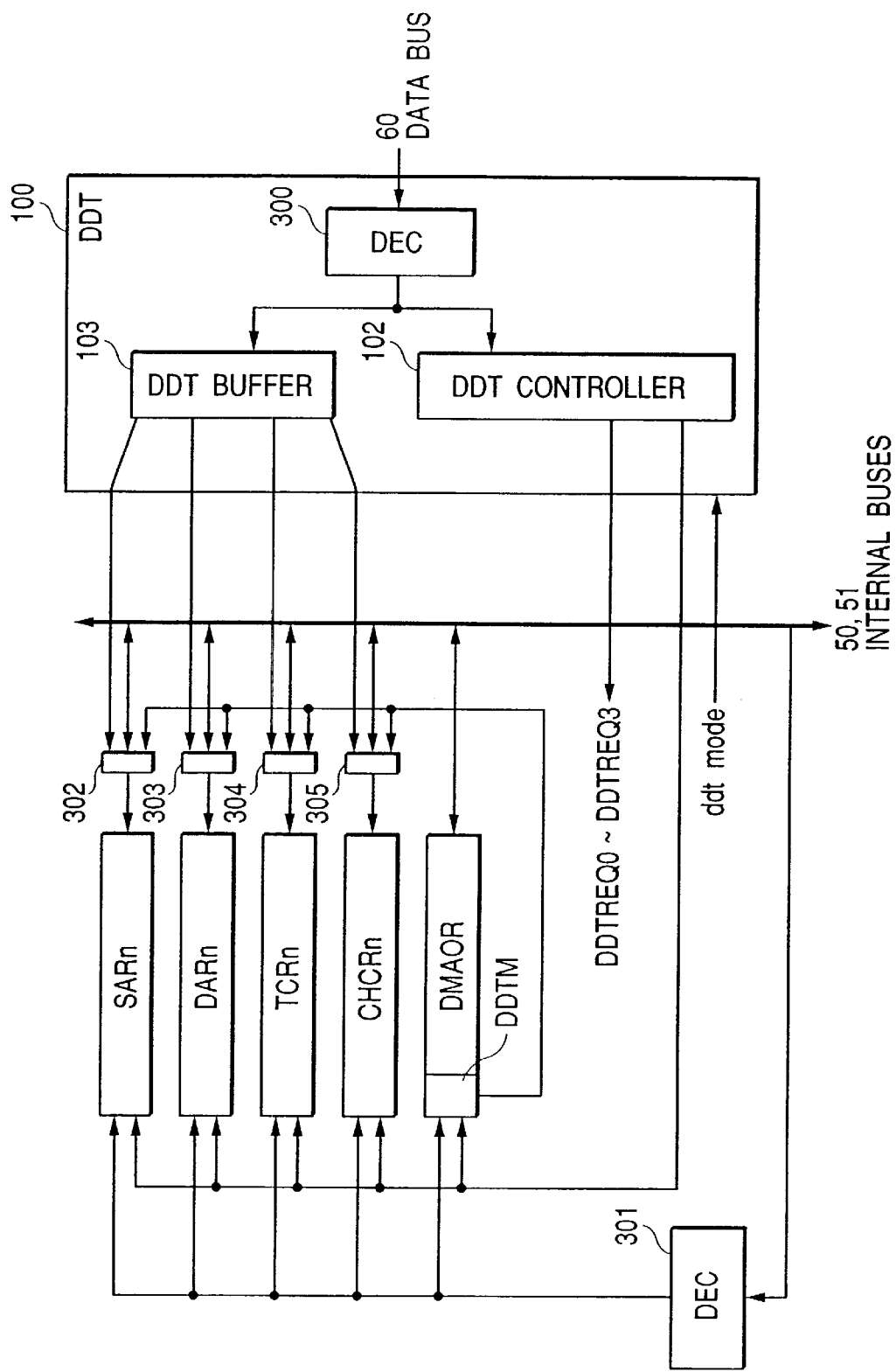
FIG. 26 is a diagram illustrating connections between a DDT and a DMAC.

In FIG. 26, the same elements as those shown in FIG. 5 are identified by the same symbols. Data transfer request channel data ID1 and ID0 in a data transfer set command DTR supplied from a bus 60 are decoded by a decoder 300. A source address register SAR to which a transfer source address is set, a destination address register DAR to which a transfer destination address is set, a transfer count register TCR for counting the number of times that transfer is performed, and a channel control register CHCR to which the state of data transfer control for each data transfer channel is set, are defined for each of the data transfer channels (corresponding to data transfer channels 0 through 3). Therefore, the decoder 300 decodes the data transfer request channel data ID1 and ID0 to detect the data transfer channels to be set, whereby the corresponding registers (SAR, DAR, TCR and CHCR) can be defined from respective register groups (SARn, DARn, TCRn and CHCRn). That is, a DDT control circuit 102 detects data transfer channels in accordance with the result of decoding by the decoder 300 and selects (designates) respective registers corresponding to the detected data transfer channels from the register groups (SARn, DARn, TCRn and CHCRn). Respective data held in a DDT buffer 103 are supplied and set to the selected registers through selectors 302, 303, 304 and 305, respectively. For example, address data A0 through A31 in the data transfer set command DTR are supplied and set to the source address register SAR or the destination address register DAR through the selector 302 or 303. Further, data transfer number-of-times data CT7 through CT0 in the data transfer set command DTR are supplied and set to the transfer count register TCR through the selector 304. Moreover, data MD1 and MD0 in the data transfer set command DTR, for designating transfer operation modes, and size data SZ2, SZ1, SZ0, etc. in the data transfer set command DTR are supplied and set to the channel control register CHCR through the selector 305.

On the other hand, the selection and setting of the respective registers by the CPU 3 are performed as follows: Since an address space of the CPU 3 is mapped to each register, address signals supplied to an internal address bus 51 from the CPU 3 through an address translation unit 4 are decoded by a decoder 301 so that registers to be set are selected from the respective register groups (SARn, DARn, TCRn and CHCRn). Further, respective set data outputted to a data bus 50 from the CPU 3 are respectively supplied and set to the selected registers through the selectors 302, 303, 304 and 305.

Whether the respective selectors 301, 302, 303 and 304 supply data outputted from a DDT 100 to the register groups or supply data on the internal bus 50 to the register groups, is determined according to the value of the control bit DDTM. Although the invention is not limited in particular, the control bit DDTM is initially set to a value such that the internal bus 50 is connected to the above-described registers when the power for the microcomputer is turned on.

Incidentally, the bus 80 and,the bus interface circuit 81 have been omitted to facilitate the description of FIG. 26. It is to be understood that these elements are provided between the selectors and the internal bus 50 in FIG. 26. It is also to be understood that the register control circuit 83 is provided with the decoder 301.

A description will next be made of data transfer protocols at the time that the external I/O 65 is used as a data transfer request source. Although the invention is not restricted in particular, the data transfer protocols include a first normal data transfer operation, a second normal data transfer operation, a third normal data transfer operation, a first handshake protocol transfer operation, a second handshake protocol transfer operation, a direct data transfer operation and a data transfer interrupt operation.

Although the invention is not restricted in particular, the DDT (Demand Data Transfer) control circuit 102 makes a decision as to whether any of the data transfer protocols is designated.

As will be understood from the subsequent description, the first normal data transfer operation is performed using control information (such as a transfer source address or a transfer destination address, etc.) designated by a data transfer set command, and data transfer channels. The second normal data transfer operation is carried out by using control information designated by the CPU and data transfer channels designated by a data transfer set command. Further, the third normal data transfer operation is performed by using the control information and data transfer channels that were used in the immediately preceding transfer operation.

The first handshake protocol transfer operation is started based on a specific data transfer set command (information on a bus) and a transfer request signal, whereas the second handshake protocol transfer operation is started based on a transfer request signal (indicative of the absence of the information on the bus).

Figure 6:
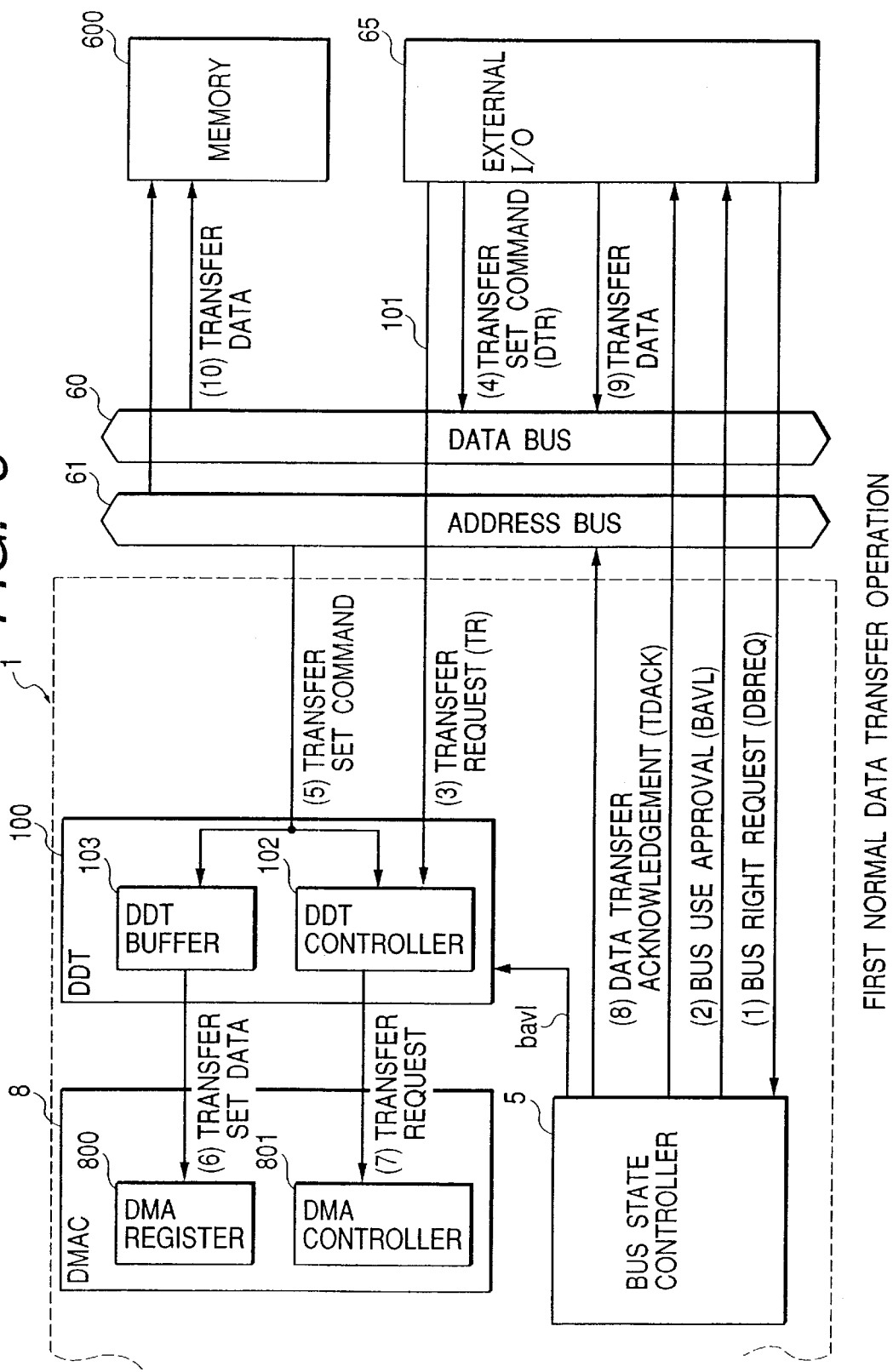
FIG. 6 is a diagram for describing a first normal data transfer operation with the transfer of data from an external I/O to a memory as an example.
Figure 7:
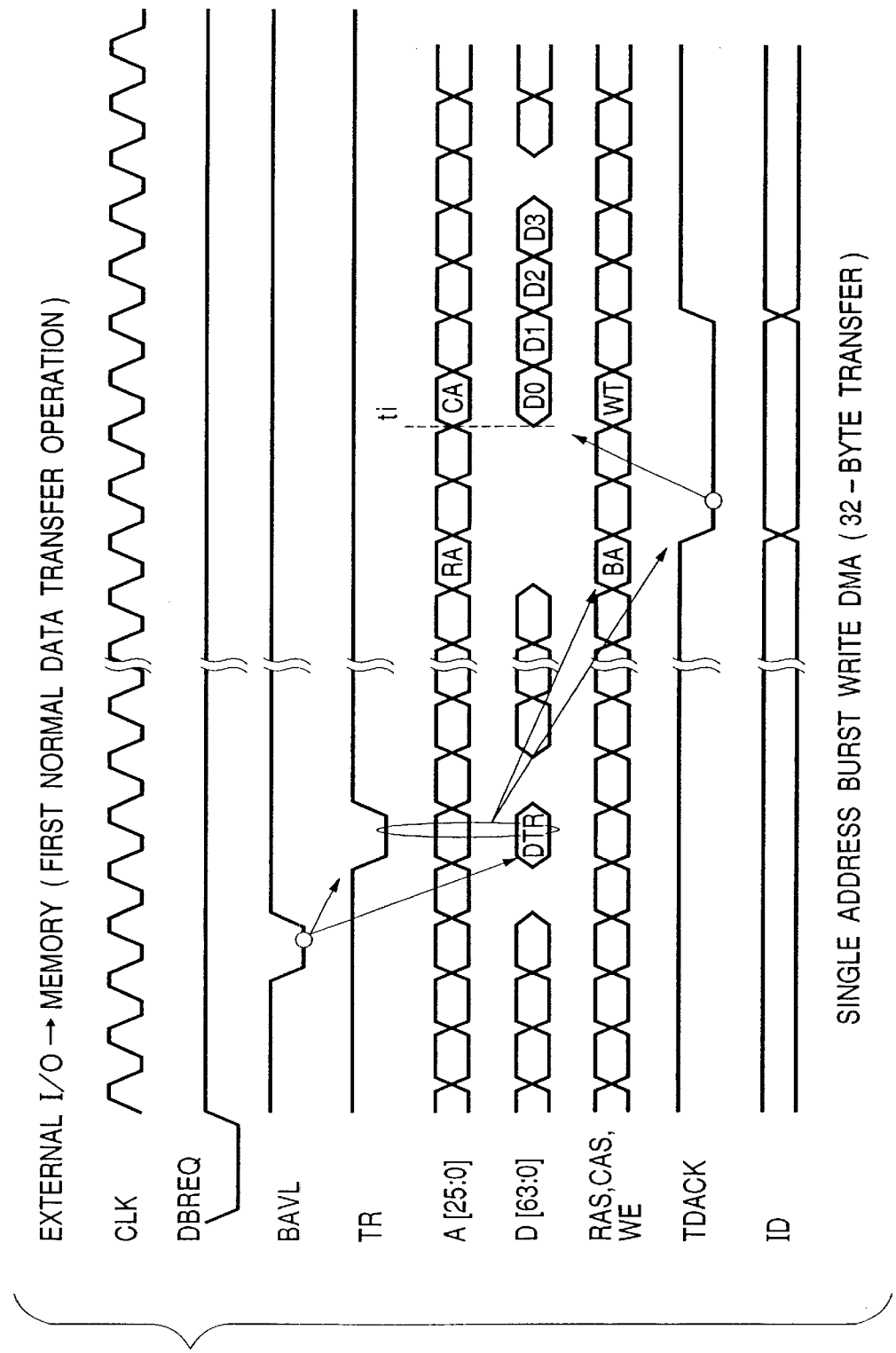
FIG. 7 is a timing chart concerning the transfer of data from the external I/O to the memory under the first normal data transfer operation.
Figure 8:
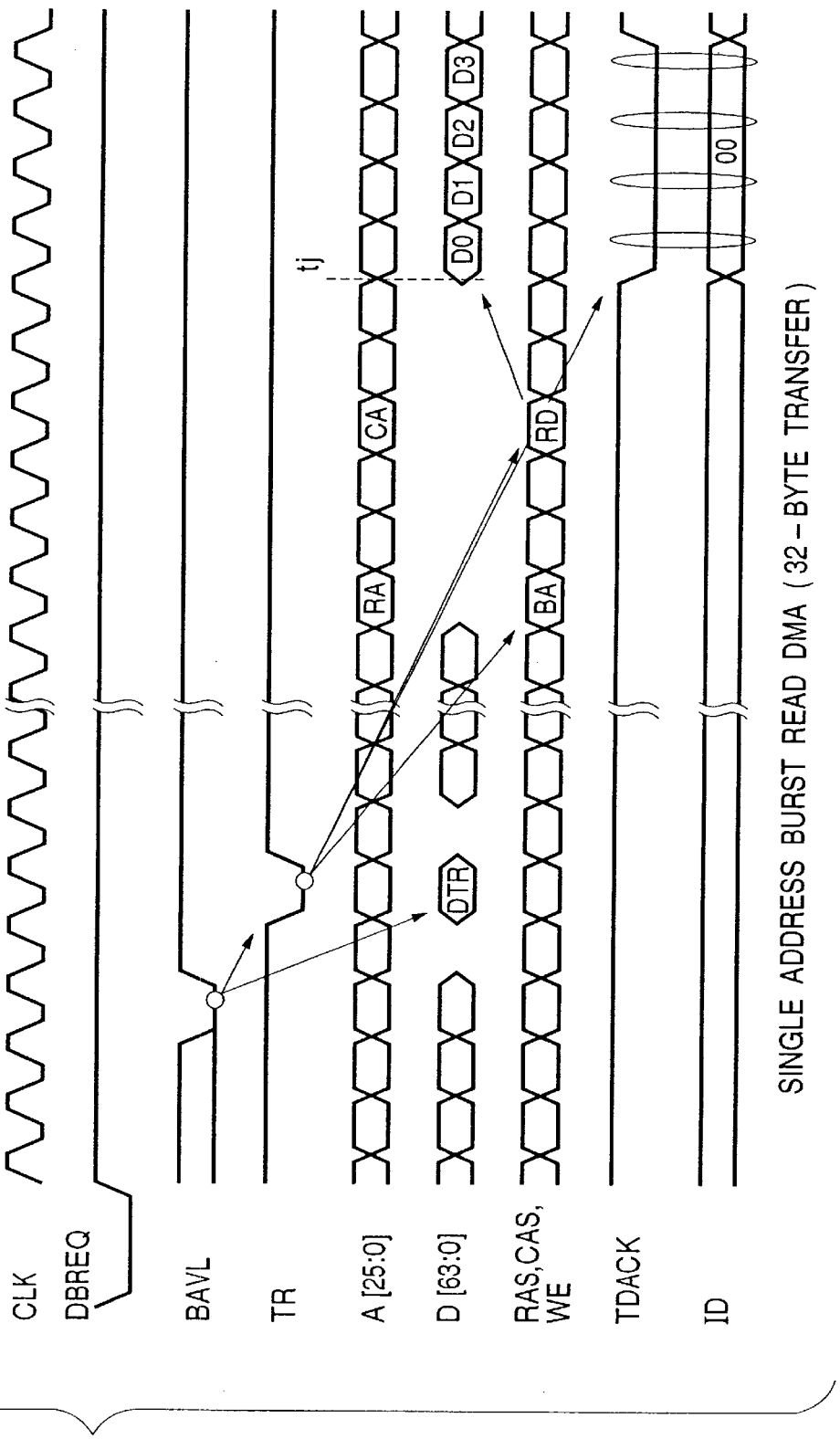
FIG. 8 is a timing chart concerning the transfer of data from the memory to the external I/O under the first normal data transfer operation.

FIG. 6 is a diagram for describing the first normal data transfer operation in which the transfer of data from an external I/O to a memory is shown as an example. The form of representation shown in FIG. 6 corresponds to that in FIG. 5. In FIG. 6, a DMA register 800 is a general representation of the registers SARn, DARn, TCRn, CHCRn and DMAOR. A DMA controller 801 is a general representation of the start-up control circuit 84 and the request priority control circuit 85. FIG. 7 shows a timing chart concerning the transfer of data from the external I/O to the memory during the first normal data transfer operation. FIG. 8 illustrates a timing chart concerning the transfer of data from the external I/O to the memory during the first normal data transfer operation.

The first normal data transfer operation is carried out as follows: An external I/O 65 obtains a bus right, and thereby outputs a transfer set command DTR to the bus 60 and supplies a transfer request signal TR to the DDT 100 through the dedicated signal line 101. Thus, the DDT 100 initially sets data transfer control information to the DMA register 800 in accordance with the contents of the transfer set command DTR and instructs the DMA controller 801 to start data transfer. In response to this, the DMAC 8 performs a data transfer control operation in a single addressing mode, and hence the external I/O 65 outputs data to a transfer destination as a data transfer request source or inputs data from a transfer source memory 600.

Described more specifically, when it is desired to start DMA transfer, the external I/O 65 first requests the bus controller 5 to give it a bus right, based on a bus right request signal DBREQ. A bus use approval signal BAVL is asserted so that the external I/O 65 acquires the bus right. The -external I/O 65 asserts a transfer request signal TR after two cycles of a clock signal CLK (corresponding to an operation reference clock signal of a system) since the assertion of the bus use approval signal BAVL, and outputs a data transfer set command DTR to the external data bus 60. The DDT 100 recognizes the supply of the transfer request signal TR with the data transfer set command DTR in response to a signal bavl asserted in synchronism with the assertion of the signal BAVL. The data transfer set command DTR is supplied to both a DDT buffer 103 and a DDT controller 102. Although the invention is not restricted in particular, the first normal data transfer operation is made possible for a data transfer channel 0 alone. The DDT controller 102 makes a decision as to whether data ID1 and ID0 in the data transfer set command DTR indicate a transfer request to the data transfer channel 0. If the answer is found to be Yes, then the DDT controller 102 initially sets data transfer control information to the DMA register 800 related to the data transfer channel 0 in accordance with the contents of the data transfer set command DTR and brings it to a state capable of starting data transfer according to a start-up request to a data transfer operation for the data transfer channel 0. After the completion of its initial setting, the DDT controller 102 instructs the DMA controller 801 to start the data transfer operation for the data transfer channel 0 in response to a request signal DDTREQ0. Thus, the DMAC 8 starts the data transfer control in the single addressing mode in accordance with the initial setting. That is, a data strobe signal TDACK is outputted together with each address signal. In synchronism with this, the external I/O 65 performs a data output operation from a time ti shown in FIG. 7 as the data transfer request source or performs a data input operation from a time tj shown in FIG. 8. When the external I/O 65 is set as a data transfer source as shown in FIGS. 6 and 7, channel identification information ID outputted from the bus controller 5 is not required. However, when the external I/O 65 is set as a data transfer destination, it captures data from the memory 600 only when the channel identification information ID is "00", which refers to the data transfer channel 0, as shown in FIG. 8. In FIGS. 7 and 8, a DRAM (Dynamic Random Access Memory) or a synchronous. DRAM is used as the memory 600, RA indicates a row address, CA indicates a column address, BA indicates the selection of a memory bank in which respective strobe signals RAS, CAS and WE are made valid, WT indicates that the operation designated by the strobe signal WE at this time is a write operation, and RD indicates that the operation is a read operation. Further, data D0, D1, D2, D3 and the like are outputted or inputted in synchronism with the clock signal CLK.

If the external I/O 65 used as the data transfer request source desires to perform data transfer in accordance with the first normal data transfer operation, it can carry out data transfer processing with its timing without noting the state of processing by the microcomputer 1, whereby the data transfer with the external I/O 65 as a principal part or base is allowed. Since the CPU 3 is not required for the initial setting of the data transfer control information, no load is imposed to the CPU 3 and the CPU 3 can be distributed to other processes during that time, whereby the data processing performance of the microcomputer 1 and the data processing performance of the data processing system as a whole can be improved.

Figure 9:
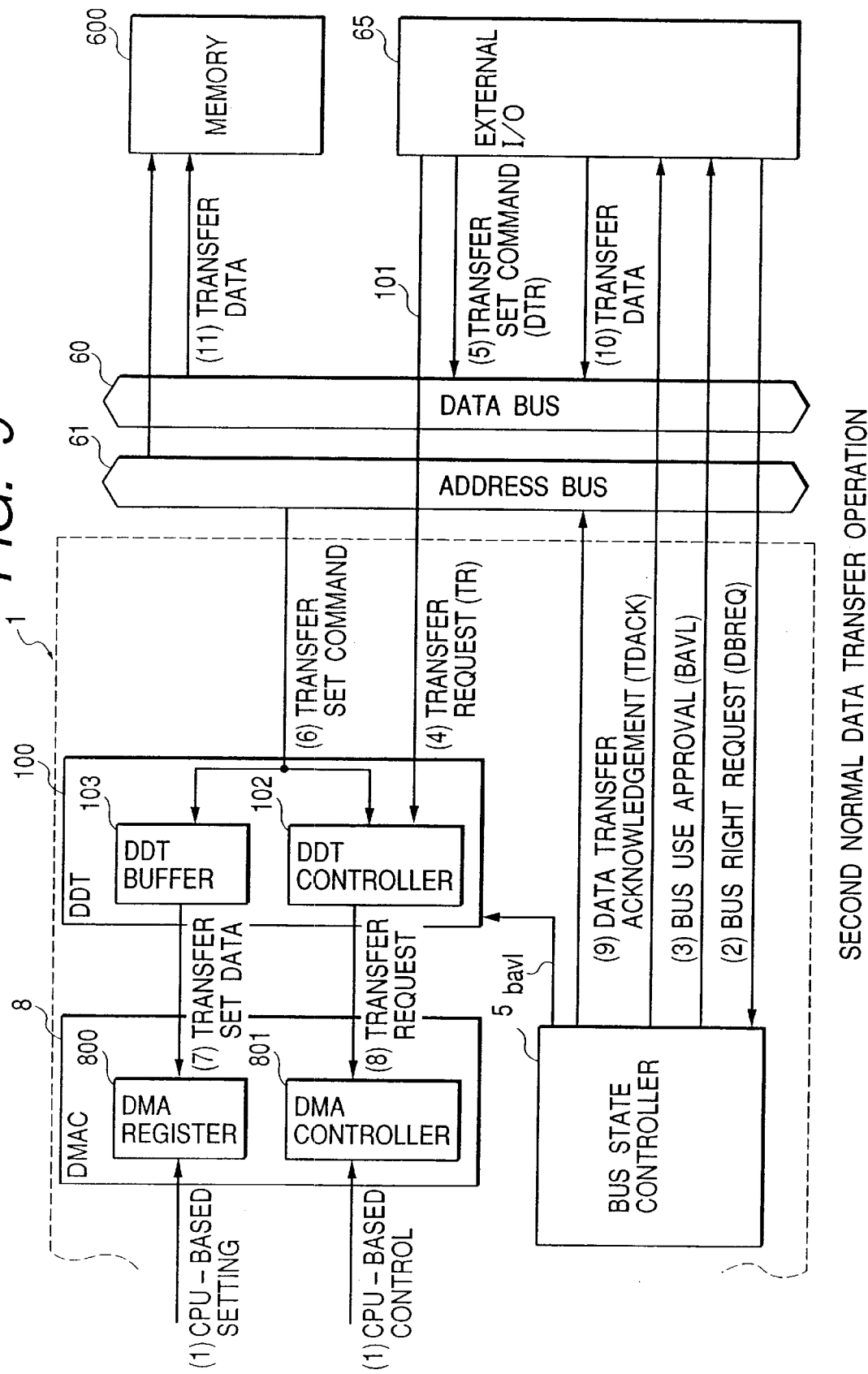
FIG. 9 is a diagram for describing a second normal data transfer operation with the transfer of data from an external I/O to a memory as an example.
Figure 10:
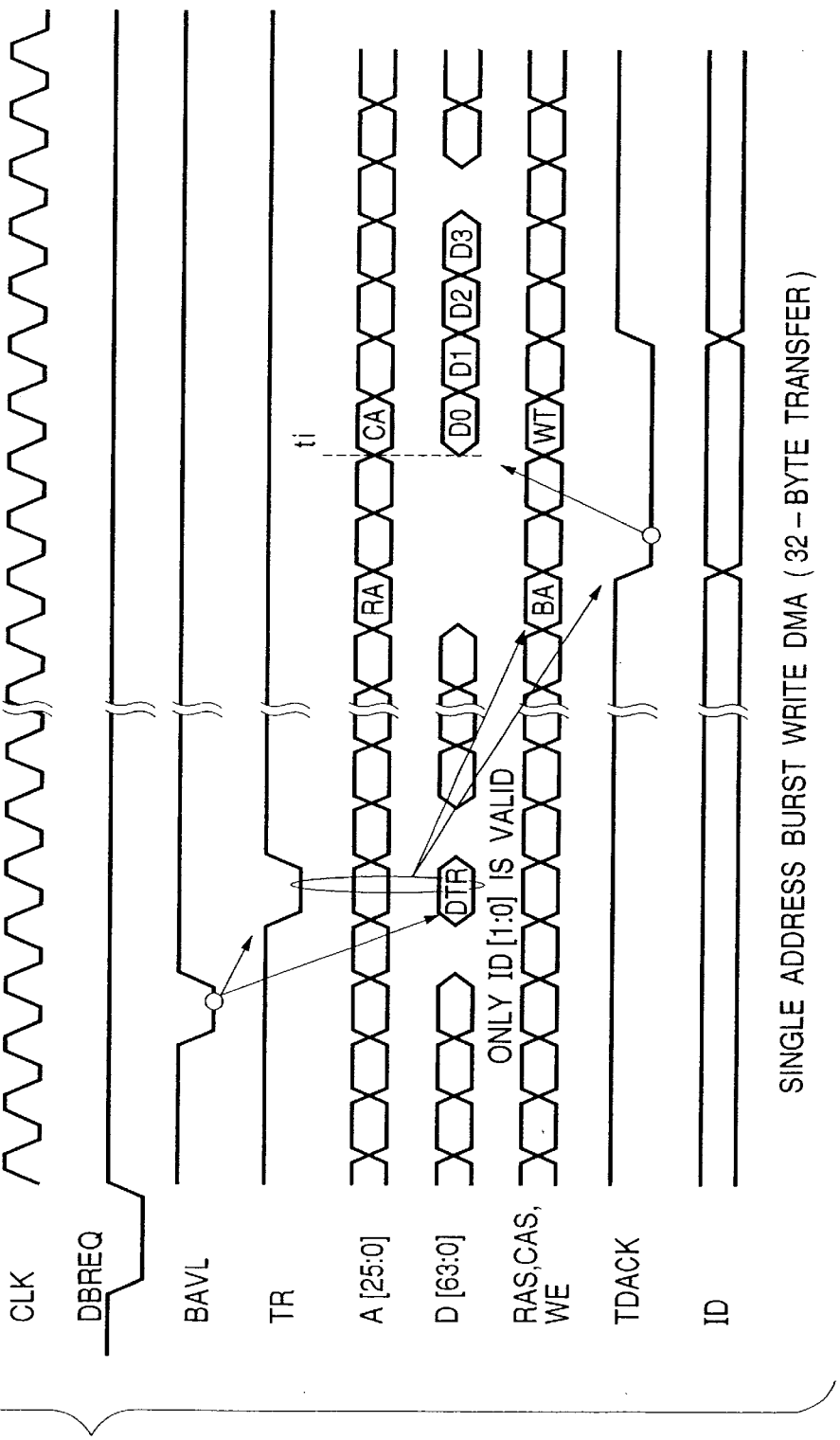
FIG. 10 is a timing chart concerning the transfer of data from the external I/O to the memory under the second normal data transfer operation.
Figure 11:
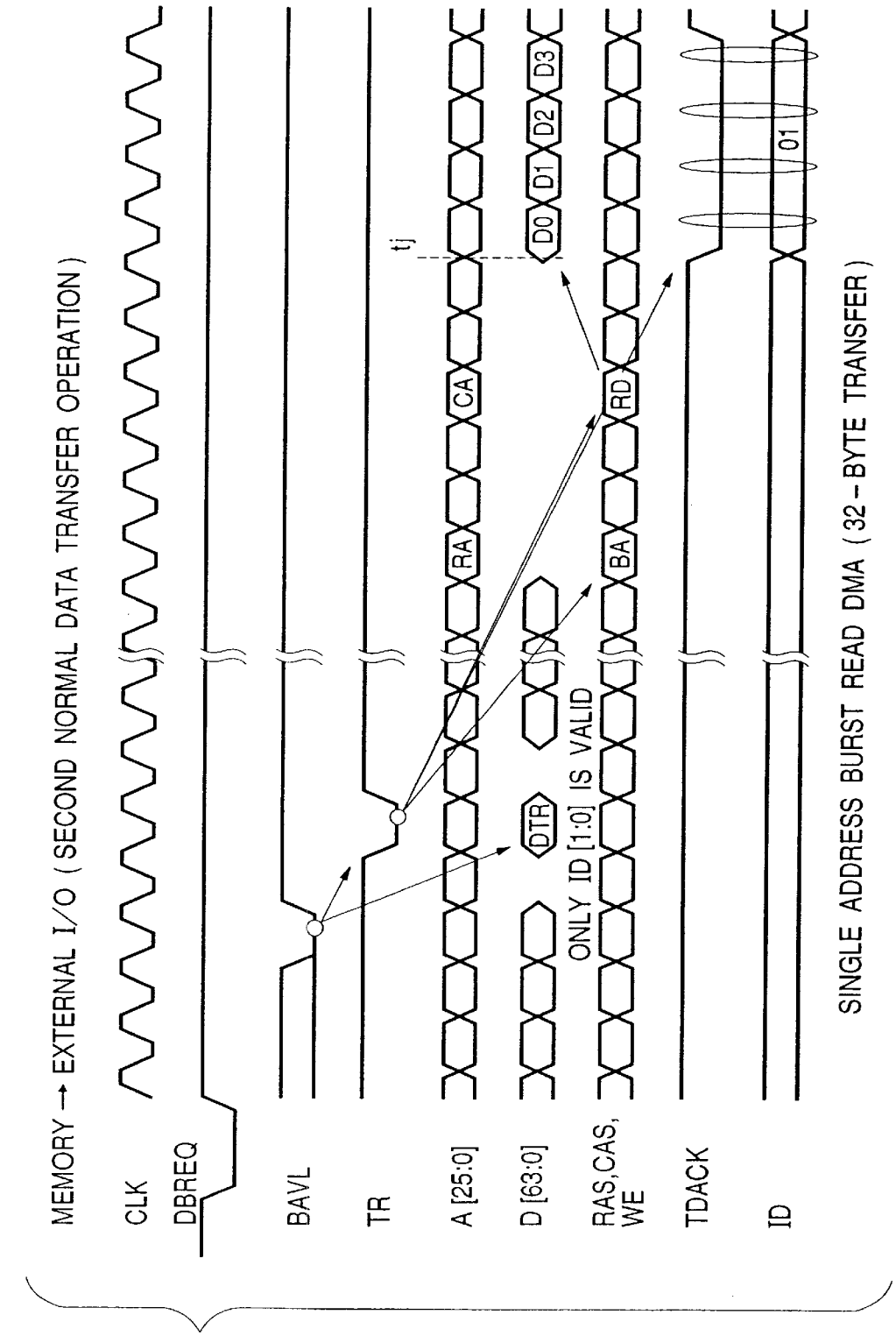
FIG. 11 is a timing chart concerning the transfer of data from the memory to the external I/O under the second normal data transfer operation.

FIG. 9 is a diagram for describing a second normal data transfer operation in which the transfer of data from an external I/O to a memory is shown as an illustrative example. FIG. 10 shows a timing chart concerning the transfer of data from the external I/O to the memory during the second normal data transfer operation. FIG. 11 shows a timing chart concerning the transfer of data from the memory to the external I/O during the second normal data transfer operation.

The second normal data transfer operation is carried out as follows: A CPU 3 performs the initial setting of data transfer control information to a DMA register 800. Thereafter, the data transfer request TR is supplied from the external I/O 65 together with the data transfer set command DTR, whereby data transfer control based on the data transfer control information initially set by the CPU 3 is performed using data transfer channels specified by the data transfer set command. Although the invention is not restricted in particular, the second normal data transfer operation is valid for data transfer channels 1 through 3.

Described more specifically, when it is desired to start DMA transfer after the DMA register 800 has been initialized by the CPU 3, the external I/O 65 first requests a bus controller 5 to issue a bus right through the use of a bus right request signal DBREQ. A bus use approval signal BAVL is asserted so that the external I/O 65 acquires the bus right. The external I/O 65 asserts a transfer request signal TR after two cycles of a clock signal CLK (corresponding to an operation reference clock signal of a system) since the assertion of the bus use approval signal BAVL, and outputs a,data transfer set command DTR to an external data bus 60. The DDT 100 recognizes that the transfer request signal TR is supplied with the data transfer set command DTR in response to a signal bavl asserted in synchronism with the assertion of the signal BAVL. The data transfer set command DTR is supplied to both the DDT buffer 103 and the DDT controller 102. Although the invention is not restricted in particular, the second normal data transfer operation is made possible for data transfer channels 1 through 3 alone. The DDT controller 102 makes a decision as to whether data ID1 and ID0 (ID) in the data transfer set command DTR indicate a transfer request to any of the data transfer channels 1 through 3. If the answer is found to be Yes, then the DDT controller 102 does not change the setting of the DMA register 800 in accordance with the contents of the data transfer set command DTR and instructs a DMA controller 801 to start a data transfer operation in response to one of request signals DDTREQ1 through DDTREQ3 corresponding to the data transfer channels designated by the data ID1 and ID0. Thus, the DMAC 8 starts the data transfer control in a single addressing mode in accordance with the data transfer control information already initially set by the CPU 3. As a result, a data strobe signal TDACK is outputted together with each address signal from the bus controller 5. In synchronism with this, the external I/O 65 performs a data output operation from a time ti shown in FIG. 10 or performs a data input operation from a time tj shown in FIG. 11 as the data transfer request source. The utilization of the channel identification information ID outputted from the bus controller 5 is the same as the case shown in FIG. 8.

According to the second normal data transfer operation, the external I/O 65 itself can start the data transfer even using the state initially set by the CPU 3.

FIG. 12 is a diagram for describing a third normal data transfer operation in which the transfer of data from an external I/O to a memory is shown by way of example. FIG. 13 shows a timing chart concerning the transfer of data from the external I/O to the memory during the third normal data transfer operation. FIG. 14 illustrates a timing chart concerning the transfer of data from the memory to the external I/O during the third normal data transfer operation.

The third normal data transfer operation is carried out as follows: After the CPU 3 has initially set data transfer control information to a DMA register 800 or after the second normal data transfer operation, a data transfer request signal TR is supplied from the external I/O 65 without being accompanied by the data transfer set command DTR, whereby new data transfer control according to the initially-set data transfer control information is performed by using the same data transfer channel as that of the immediately preceding data transfer operation. Although the invention is not restricted in particular, the third normal data transfer operation is effective for data transfer channels 1 through 3.

Described more specifically, when it is desired to start DMA transfer after the DMA register 800 has been initially set by the CPU 3 or after the second normal data transfer operation, the external I/O 65 asserts a transfer request signal TR without making a bus right request. At this time, a data transfer set command DTR is not outputted to an external data bus 60. When the DDT 100 has recognized a state in which the transfer request signal TR is asserted without the assertion of a signal bavl, the DDT controller 102 instructs the DMA controller 801 to start a data transfer operation according to one of request signals DDTREQ1 through DDTREQ3 so as to use the same data transfer channel as that used in the immediately preceding data transfer operation. Thus, a DMAC 8 starts data transfer control in a single addressing mode in accordance with the conditions already initially set by the CPU 3. As a result, a bus controller 5 outputs a data strobe signal TDACK together with each address signal. In synchronism with this, the external I/O 65 performs a data output operation from a time ti shown in FIG. 13 or carries out a data input operation from a time tj shown in FIG. 14 as a data transfer request source. The utilization of channel identification information ID outputted from the bus controller 5 is the same as the case shown in FIG. 8.

According to the third normal data transfer operation, the external I/O 65 can start the data transfer without obtaining the bus right after the data transfer control information has been set by the CPU 3.

Figure 15:
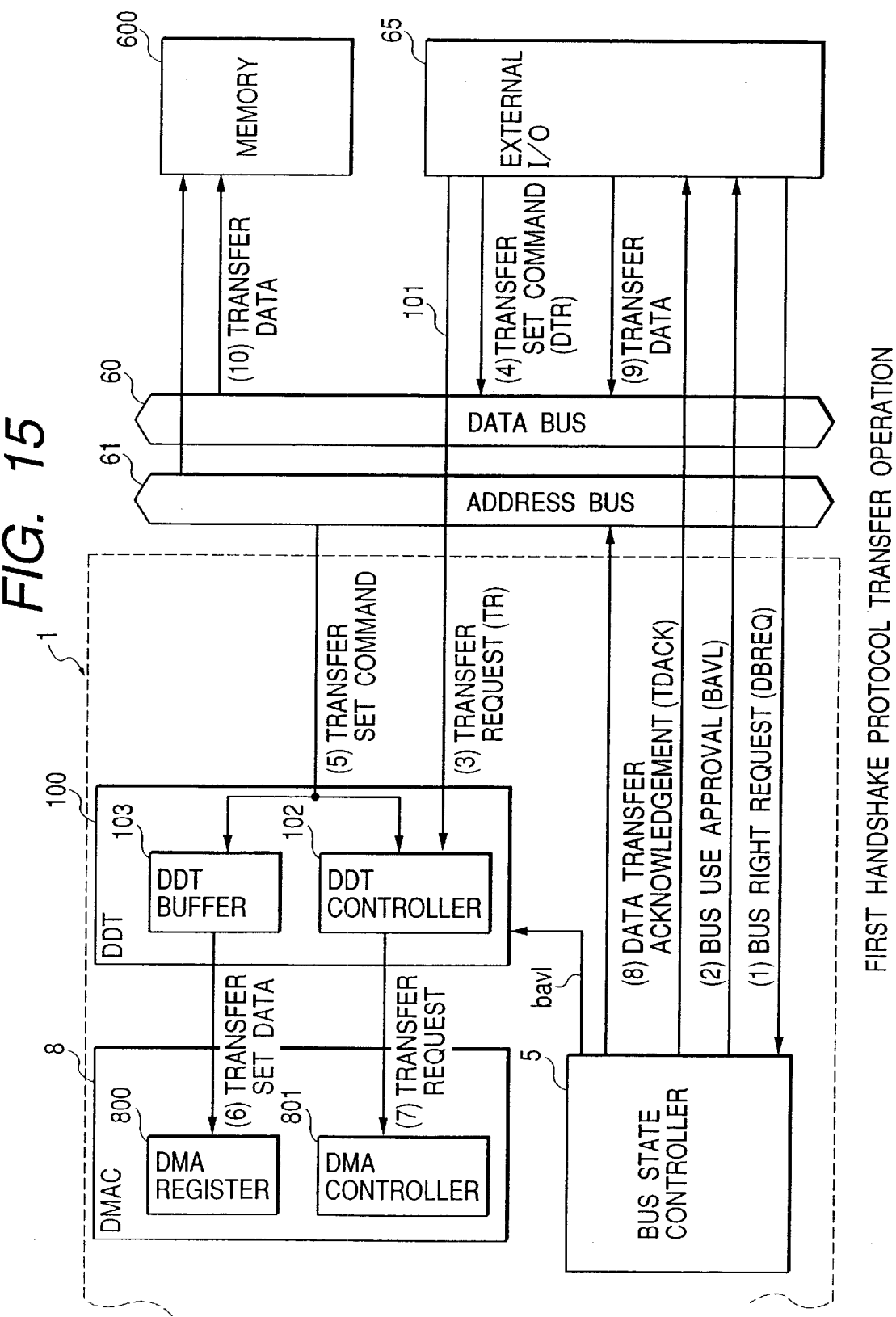
FIG. 15 is a diagram for describing a first handshake protocol transfer operation with the transfer of data from an external I/O to a memory.
Figure 16:
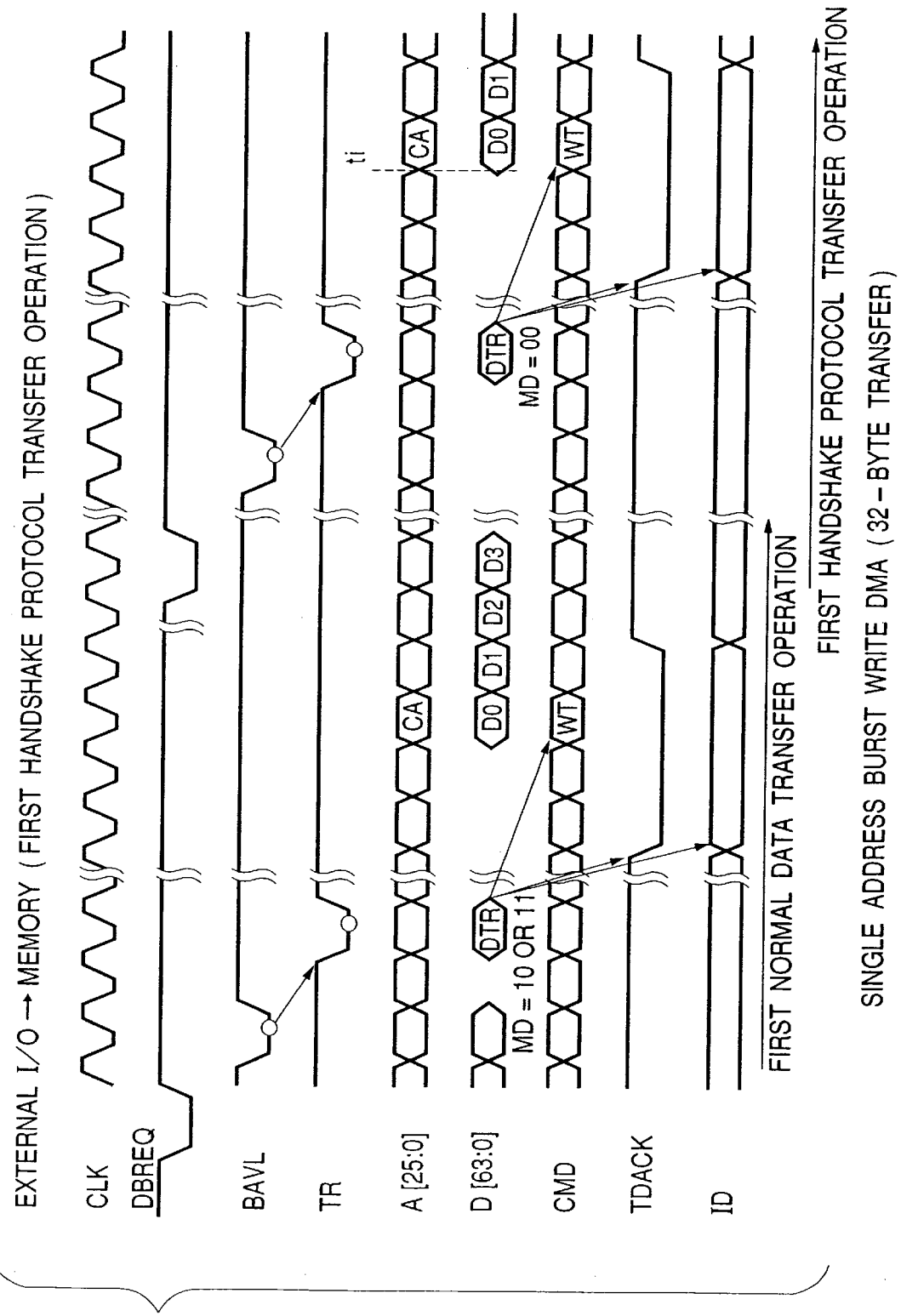
FIG. 16 is a timing chart concerning the transfer of data from the external I/O to the memory under the first handshake protocol transfer operation.
Figure 17:
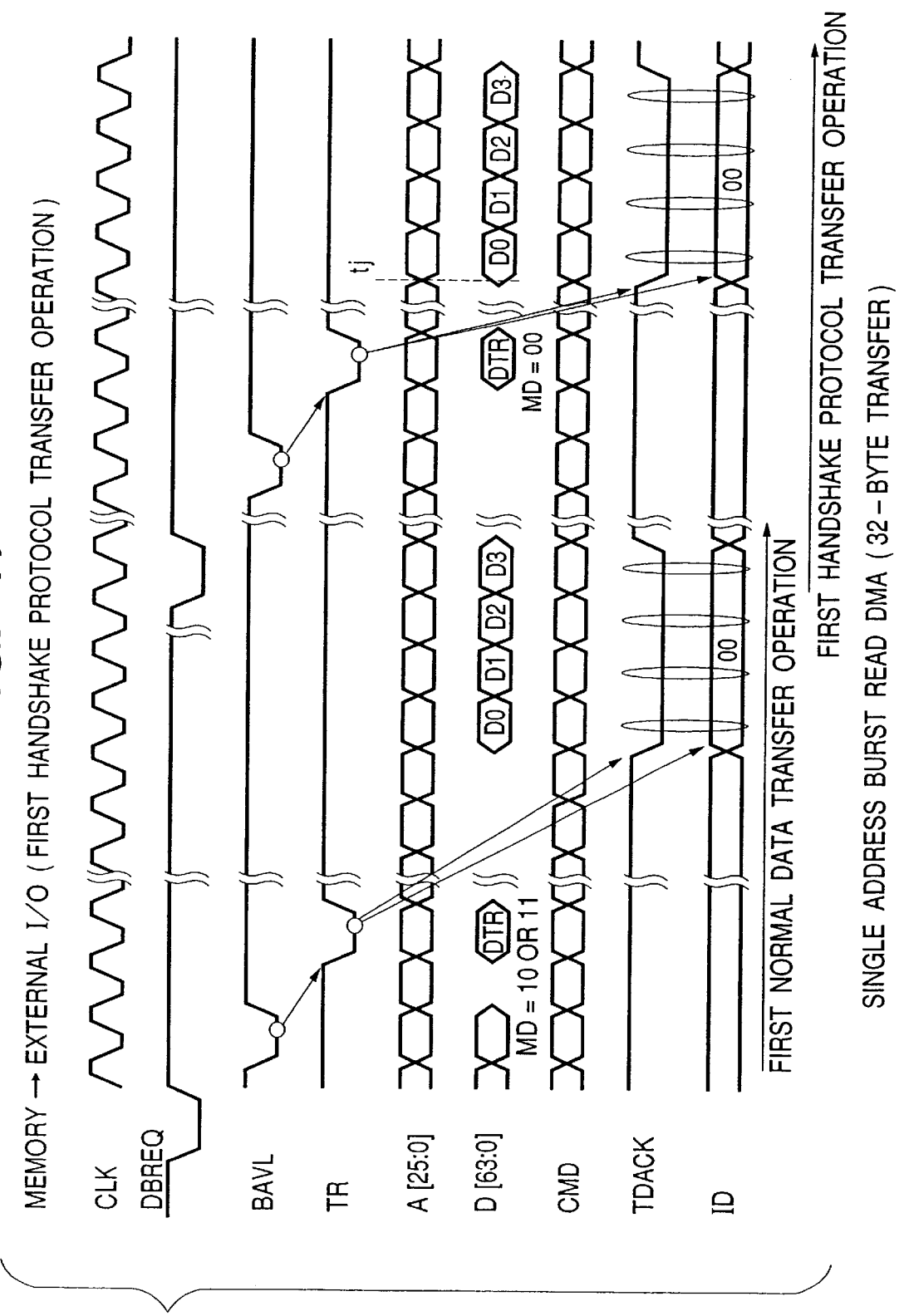
FIG. 17 is a timing chart concerning the transfer of data from the memory to the external I/O under the first handshake protocol transfer operation.

FIG. 15 is a diagram for describing a first handshake protocol transfer operation in which the transfer of data from an external I/O to a memory is shown by way of example. FIG. 16 shows a timing chart concerning the transfer of data from the external I/O to the memory during the first handshake protocol transfer operation. FIG. 17 illustrates a timing chart concerning the transfer of data from the memory to the external I/O during the first handshake protocol transfer operation.

The first handshake protocol transfer operation is an operation for performing DMA transfer continuously after the first normal data transfer operation. On condition that a data transfer set command supplied together with a data transfer request TR from the external I/O 65, after the first normal data transfer operation has been performed initially, is placed in a specific first state, e.g., MD1, MD0="0, 0", data transfer control according to the data transfer control information initially set upon the initial first normal data transfer operation is performed using the same data transfer channel as that used for the initial first normal data transfer operation.

Described more specifically, when it is desired to start DMA transfer after a data transfer channel 0 has been used to designate MD1, MD0="1, 0" or "1, 1" and the first normal data transfer operation has been performed in this state, the external I/O 65 first requests a bus controller 5 to issue a bus right through the use of a bus right request signal DBREQ. A bus use approval signal BAVL is asserted so that the external I/O 65 acquires the bus right. The external I/O 65 asserts a transfer request signal TR after two cycles of a clock signal CLK (corresponding to an operation reference clock signal of a system) since the assertion of the bus use approval signal BAVL, and outputs a data transfer set command DTR to an external data bus 60 as MD1, MD0="0, 0". A DDT 100 recognizes that the transfer request signal TR is supplied with the data transfer set command DTR in response to a signal bavl asserted in synchronism with the assertion of the signal BAVL. A DDT controller 102 detects MD1, MD0="0, 0" to thereby recognize the designation of the first handshake protocol transfer operation and requests a DMA controller 801 to start data transfer according to a transfer request signal DDTREQ0 without re-setting the data transfer control information based on the data transfer set command DTR. Thus, a DMAC 8 starts the data transfer using the data transfer control information already set to the data transfer channel 0 as it is. As a result, a data strobe signal TDACK is outputted together with each address signal. In synchronism with this, the external I/O 65 performs a data output operation from a time ti shown in FIG. 16 or performs a data input operation from a time ti shown in FIG. 17 as a data transfer request source. The utilization of the channel identification information ID outputted from the bus controller 5 is the same as that of the case shown in FIG. 8.

According to the first handshake protocol transfer operation, the data transfer request issued from the external I/O 65 can be easily performed where it is unnecessary to change the data transfer control conditions initially set by the command for the first normal data transfer operation.

Figure 18:
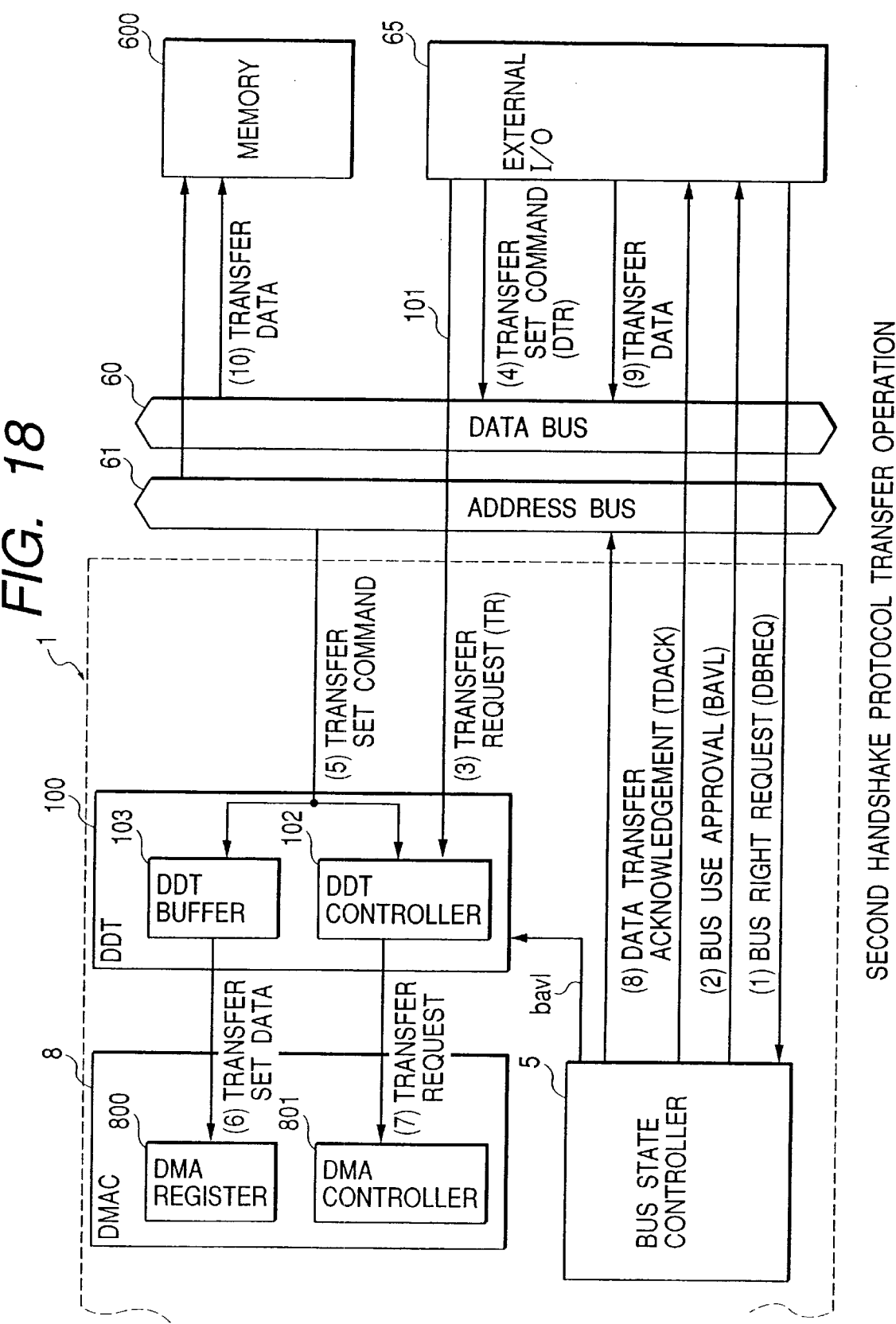
FIG. 18 is a diagram for describing a second handshake protocol transfer operation with the transfer of data from an external I/O to a memory as an example.
Figure 19:
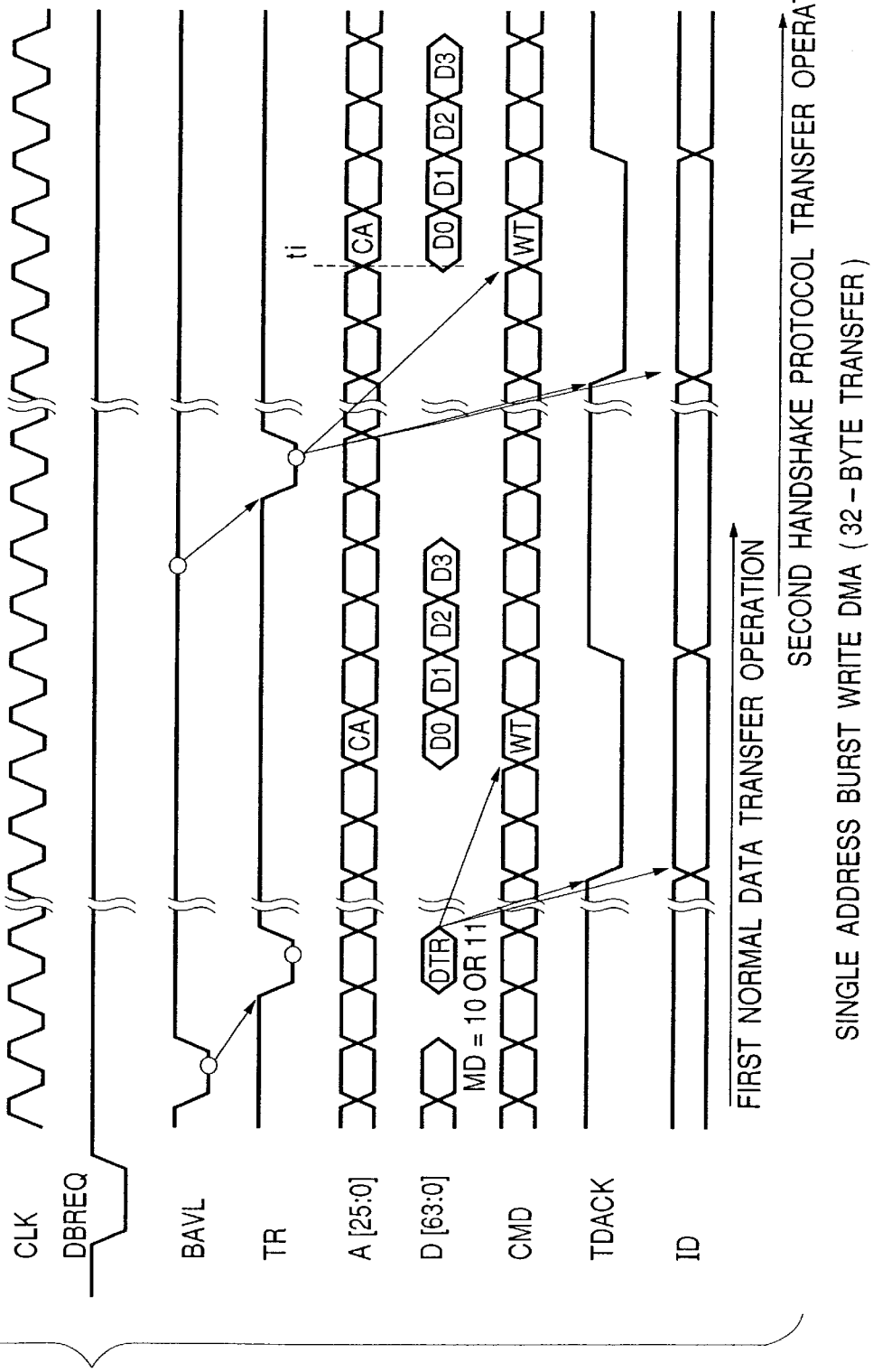
FIG. 19 is a timing chart concerning the transfer of data from the external I/O to the memory under the second handshake protocol transfer operation.
Figure 20:
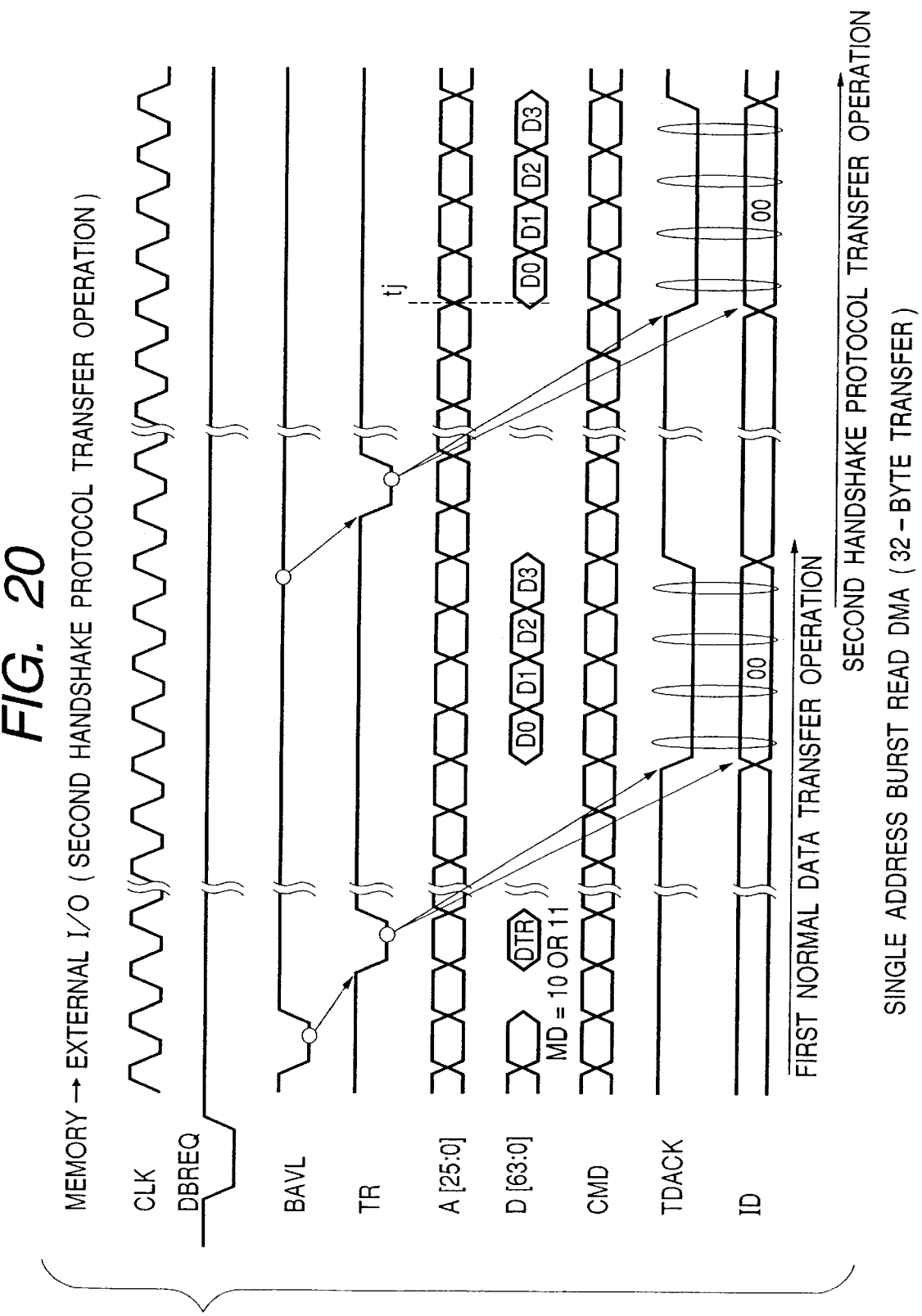
FIG. 20 is a timing chart concerning the transfer of data from the memory to the external I/O under the second handshake protocol transfer operation.

FIG. 18 is a diagram for describing a second handshake protocol transfer operation in which the transfer of data from an external I/O to a memory is shown by way of example. FIG. 19 shows a timing chart concerning the transfer of data from the external I/O to the memory during the second handshake protocol transfer operation. FIG. 20 illustrates a timing chart concerning the transfer of data from the memory to the external I/O during the second handshake protocol transfer operation.

The second handshake protocol transfer operation is an operation for performing DMA transfer continuously after the first normal data transfer operation. on condition that a data transfer request TR is issued in a state in which an external I/O 65 has no acquisition of a bus right, data transfer control according to the data transfer control information initially set upon the initial first normal data transfer operation is performed using the same data transfer channel as that used for the initial first normal data transfer operation.

Described more specifically, when the external I/O 65 desires to start DMA transfer after a data transfer channel 0 has been used to designate MD1, MD0="1, 0" or "1, 1" and the first normal data transfer operation has been performed in this state, the external I/O 65 outputs a data transfer request TR to a DDT controller 102. At this time, the DDT controller 102 confirms, based on a signal bavl, a state in which the external I/O 65 has no acquisition of a bus right. As a result, the DDT controller 102 recognizes the designation of the second handshake protocol transfer operation and requests a DMA controller 801 to start data transfer in accordance with a transfer request signal DDTREQ0. Thus, a DMAC 8 starts the data transfer using the data transfer control information already set to the data transfer channel 0 as it is. As a result, a data strobe signal TDACK is outputted together with each address signal. In synchronism with this, the external I/O 65 performs a data output operation from a time ti shown in FIG. 19 or performs a data input operation from a time tj shown in FIG. 20 as a data transfer request source. The utilization of the channel identification information ID outputted from a bus controller 5 is the same as the case shown in FIG. 8. Thus, the data transfer can be directly processed without asserting an external data bus use request (without noting the state of use of an external data bus).

According to the second handshake protocol transfer operation, the external I/O 65 can start the data transfer of the DMAC 8 without acquiring the bus right where it is unnecessary to change the data transfer control conditions initially set by the command for the first normal data transfer operation.

Figure 21:
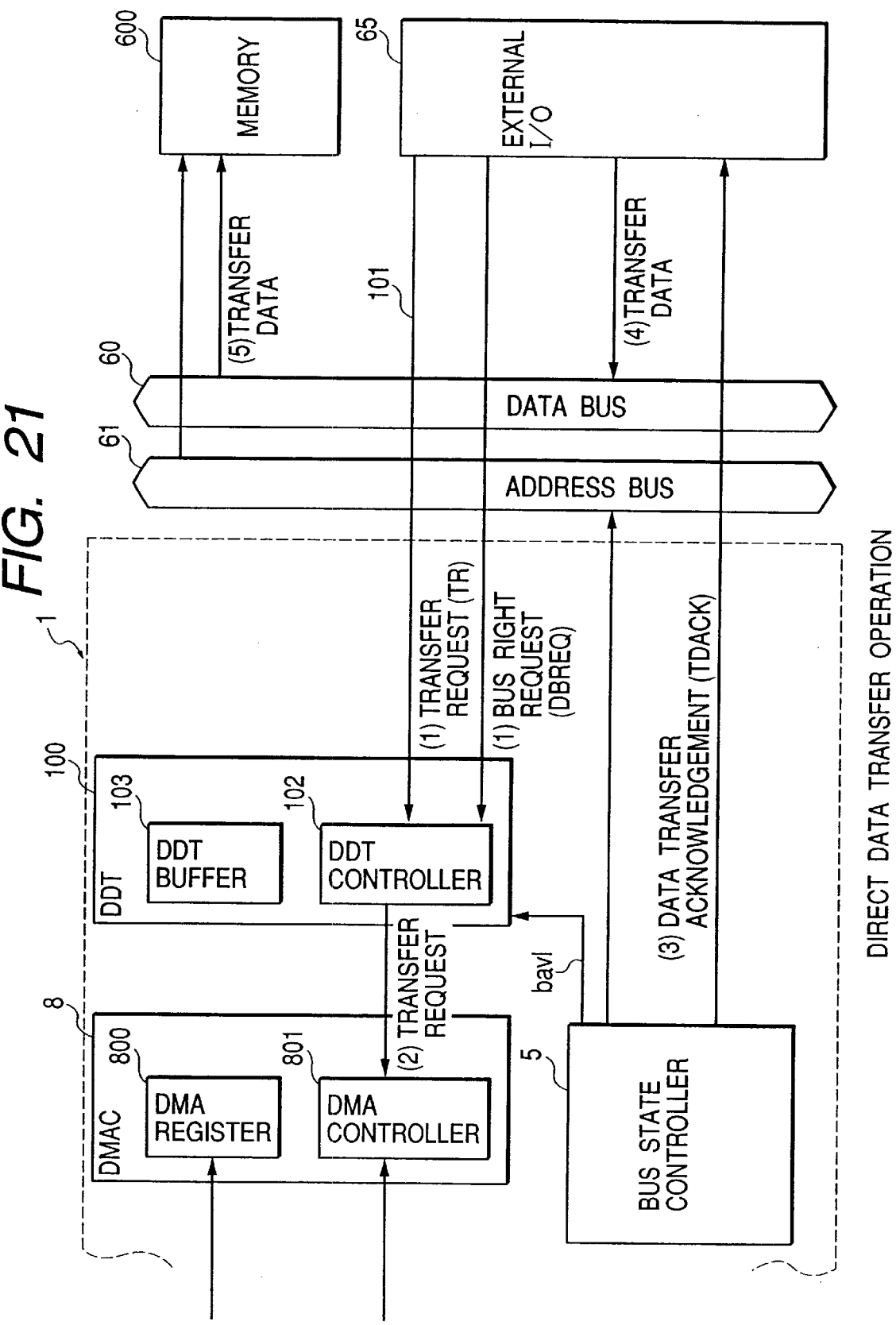
FIG. 21 is a diagram for describing a direct data transfer operation with the transfer of data from an external I/O to a memory as an example.
Figure 22:
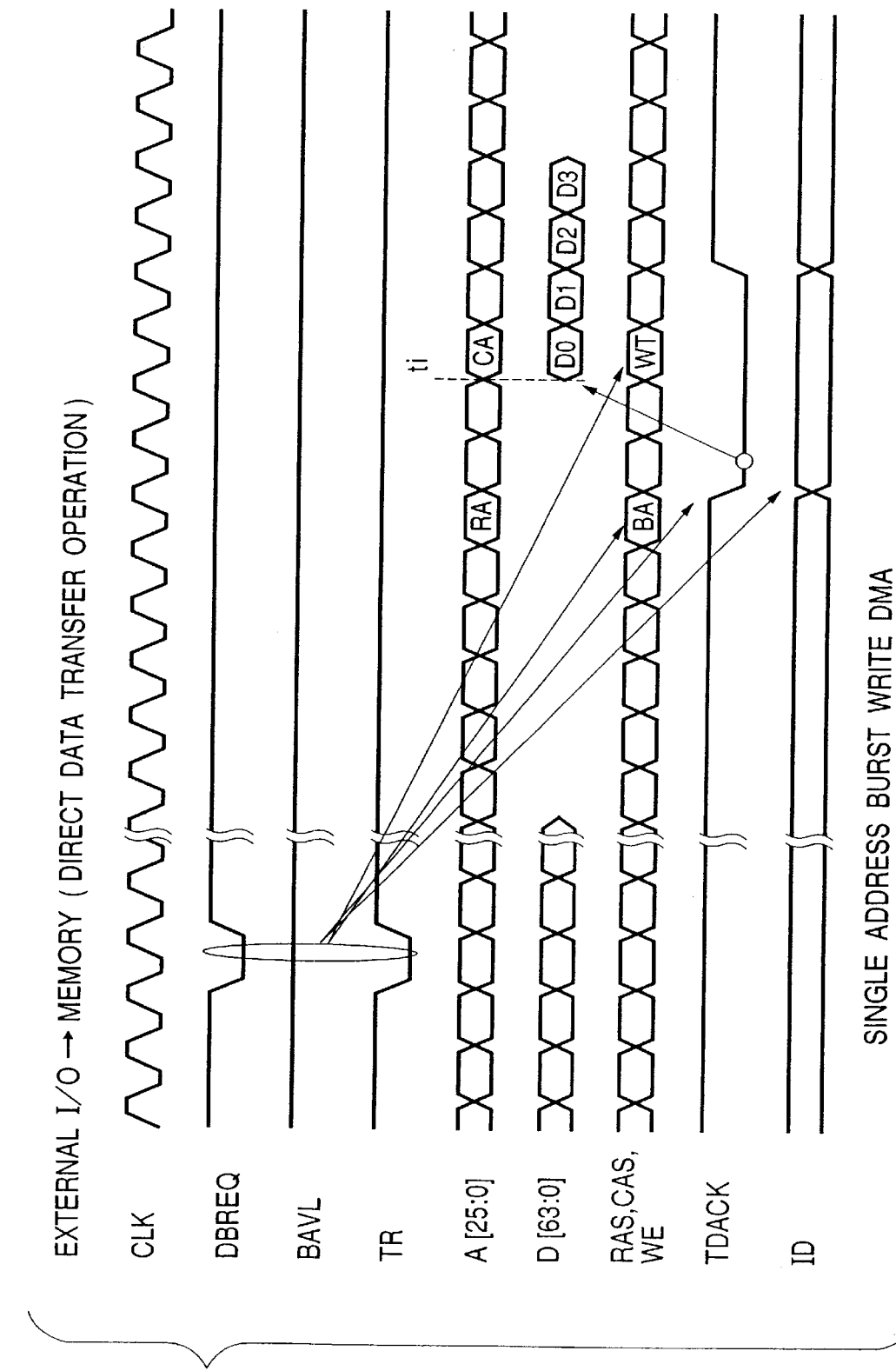
FIG. 22 is a timing chart concerning the transfer of data from the external I/O to the memory under the direct data transfer operation.
Figure 23:
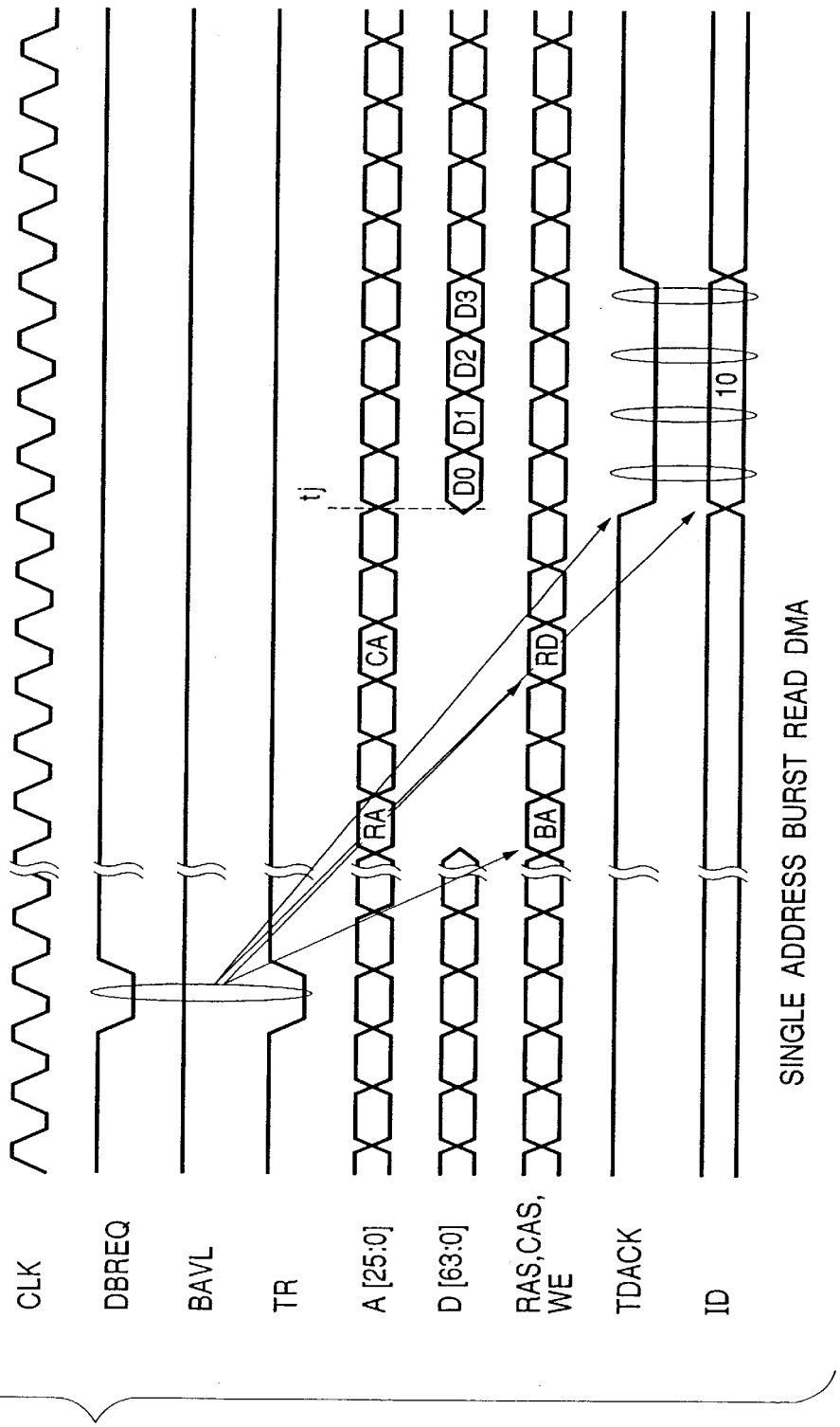
FIG. 23 is a timing chart concerning the transfer of data from the memory to the external I/O under the direct data transfer operation.

FIG. 21 is a diagram for describing a direct data transfer operation in which the transfer of data from an external I/O to a memory is shown by way of example. FIG. 22 shows a timing chart concerning the transfer of data from the external I/O to the memory during the direct data transfer operation. FIG. 23 illustrates a timing chart concerning the transfer of data from the memory to the external I/O during the direct data transfer operation.

The direct data transfer operation is an operation for setting the data transfer control information by the CPU 3 and thereafter demanding the data transfer from the external I/O 65, thereby performing DMA transfer without having to use the data bus 60. Each data transfer channel selected in this operation is fixedly determined in advance.

Described more specifically, a DDT controller 102 is allowed to assert a bus right request signal DBREQ and a data transfer request signal TR simultaneously. As a result, the DDT controller 102 recognizes that a data transfer request using a data transfer channel 2 fixedly determined in advance has been made and requests a DMA controller 801 to start data transfer through the use of a transfer request signal DDTREQ2. A DMAC 8 starts data transfer using the data transfer control information already set to the data transfer channel 2 as it is. Thus, a data strobe signal TDACK is outputted together with each address signal. In synchronism with it, the external I/O 65 performs a data output operation from a time ti shown in FIG. 22 or performs a data input operation from a time tj shown in FIG. 23 as a data transfer request source.

Figure 24:
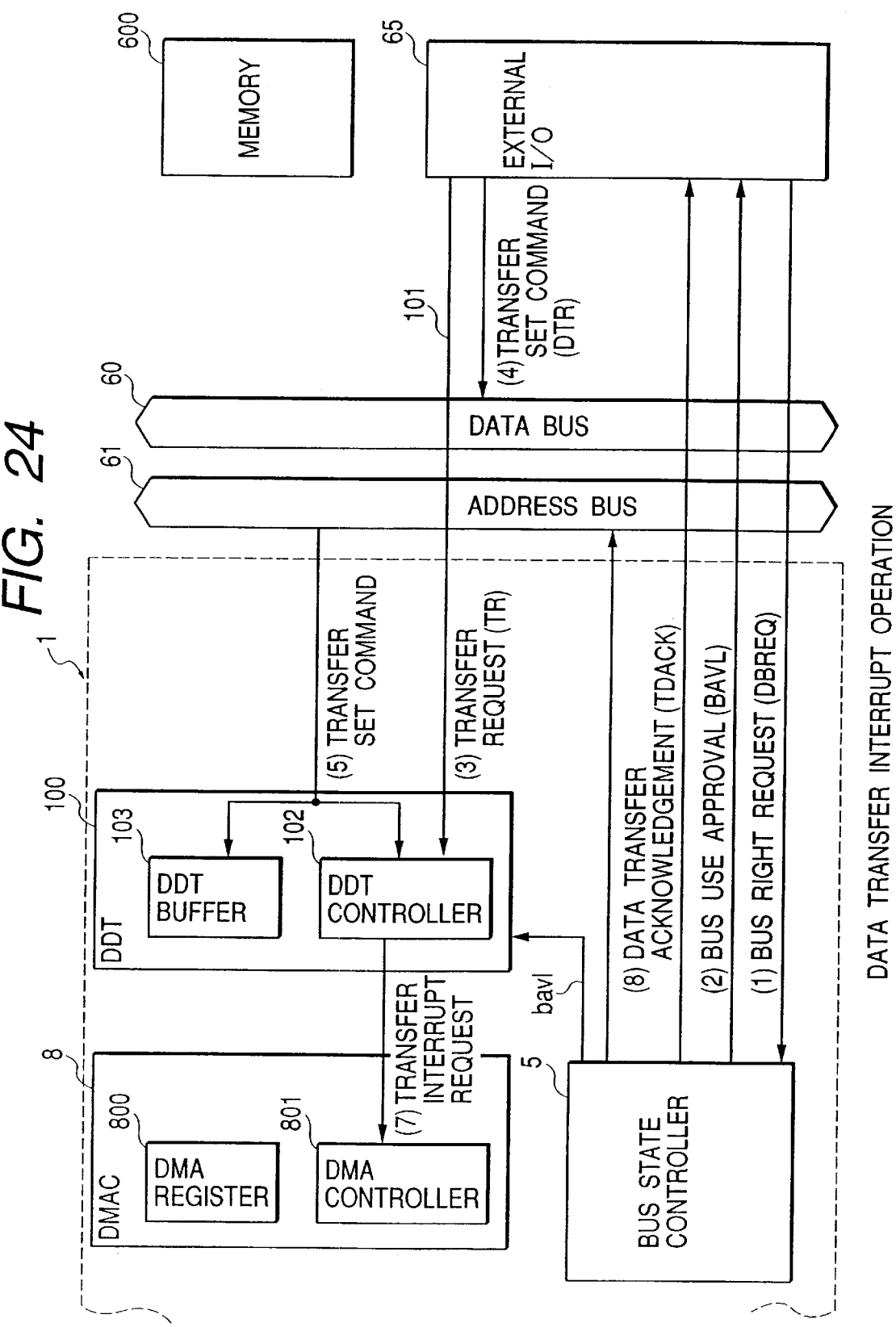
FIG. 24 is a diagram for describing a data transfer interrupt operation.
Figure 25:
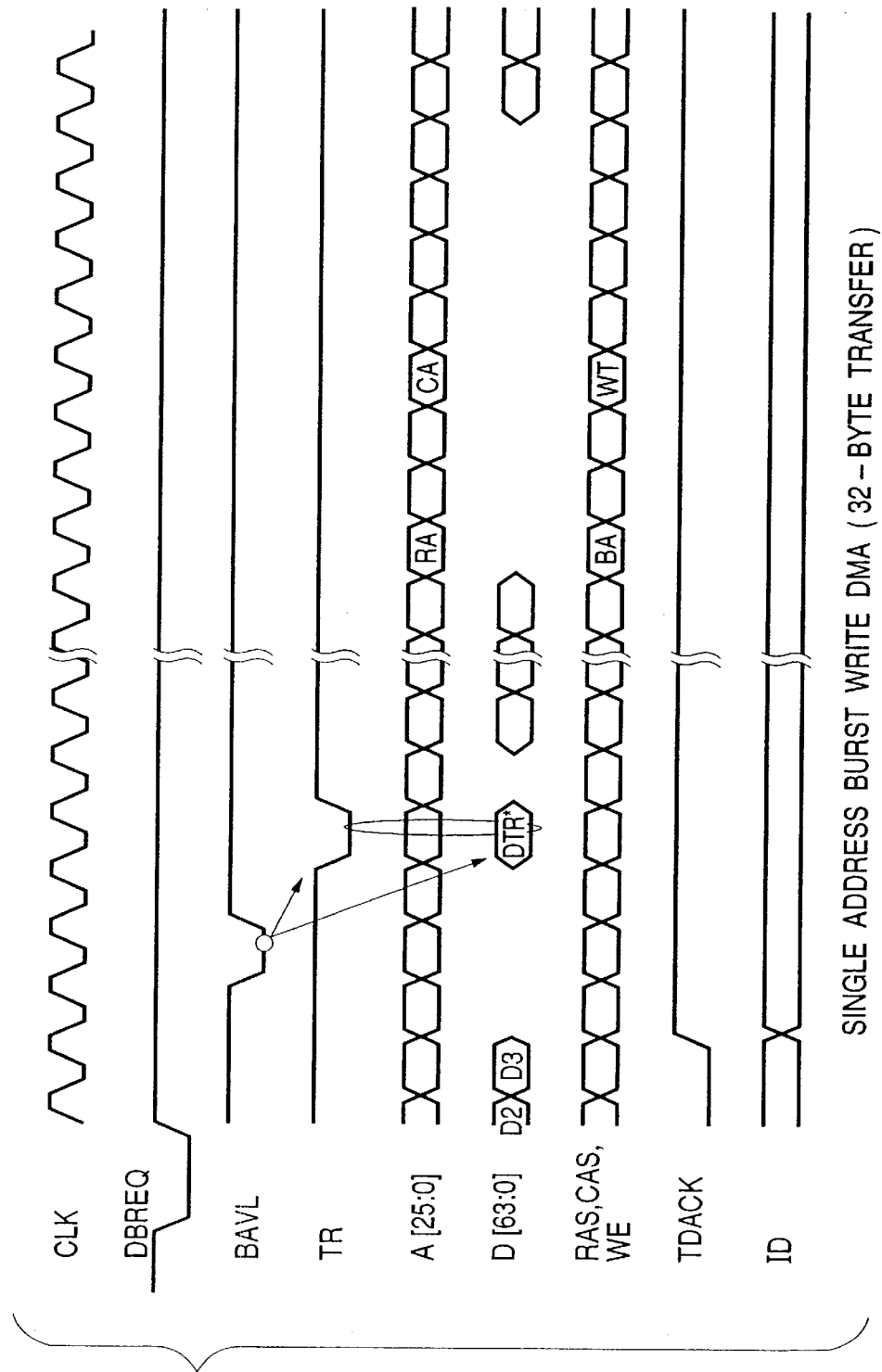
FIG. 25 is a timing chart showing a data transfer interrupt operation.

FIG. 24 is a diagram for describing a data transfer interrupt operation. FIG. 25 shows a timing chart of the data transfer interrupt operation.

The data transfer interrupt operation is carried out as follows: A DDT controller 102 detects a state in which a data transfer set command supplied from the external I/O 65 is placed in a specific state, e.g., ID1, ID0="0, 0", MD1, MD0≠"0, 0" and SZ2, SZ1, SZ0="1, 1, 1" to thereby force-complete a data transfer control operation. Here, a bus controller 5 gives the highest priority to a bus right request signal DBREQ outputted from the external I/O 65. When the bus right request signal DBREQ is outputted from the external I/O 65 even during a DMA data transfer operation, the bus controller 5 stops a bus access which is being executed at that time and releases a bus right to the external I/O 65.

According to the data transfer interrupt operation, when the external I/O 65 desires to demand a data transfer, it can stop the data transfer operation of the already-activated DMAC 8 and make a request for the data transfer with the highest priority.

While the invention made by the present inventors, has been described specifically based on various embodiments, the present invention is not limited to those embodiments. It is needless to say that various changes can be made thereto within a scope not departing from the subject of the invention as set forth therein.

For example, DMA data transfer, in which an external I/O is set as a data transfer source, is not necessarily limited to the transfer of data between the external I/O and a memory. This data transfer may be a data transfer between the external I/O and another input/output device. Further, circuit modules incorporated in a microcomputer and devices which constitute a data processing system are not limited to those employed in the above-described embodiments and may be suitably changed. Moreover, a DMAC is not limited to a configuration using a data buffer provided inside a bus controller 5. The DMAC itself may be set to a configuration having a dedicated data buffer.

Further, the external I/O 65 may be comprised of one semiconductor chip or a combination of a plurality of semiconductor chips. Moreover, the present I/O may be provided on the same semiconductor chip as that for a microcomputer.

Although the data bus and the external I/O are connected to one another by two buses in FIG. 3, they may be of course coupled to each other by one bus.

Further, if a plurality of external I/O's are prepared and transfer information (transfer destination or transfer source address data, transfer channels, etc.) inherent in the external I/O is set (stored in a command ROM), then data transfer corresponding to a changed external I/O is initially set by simply changing the external I/O, whereby the system is easily changed. In this case, the respective external I/O may of course be configured so as to have functions different from each other or the same function.

Further, only one external I/O is connected to the bus in the aforementioned embodiments. However, a plurality of external I/O's may be connected to the bus. In this case, it is desirable that bus right,requests do not overlap each other or are given a priority.

Effects obtained by a typical one of the features disclosed in the present application will be briefly described as follows.

That is, an external input/output device can output a data transfer set command together with a data transfer request without involving a CPU upon execution of data transfer and set data transfer control information to direct memory access control means. Therefore, when the input/output device used as a data transfer request source desires to perform the data transfer, the input/output device can perform data transfer processing with its timing without recognizing or noting the state of processing by a CPU and hence data transfer with the input/output device as a principal base can be performed.

Since, at this time, the CPU is not required for the initial setting of the data transfer control information, no load is imposed to the CPU and the CPU can be directed to other processes during that time, whereby the data processing performance of a microcomputer and the data processing performance of the data processing system as a whole can be improved.

What is claimed is:

1. The microcomputer, comprising:

a central processing unit;

direct memory access control unit having a plurality of data transfer channels, for performing data transfer control based on data transfer control information supplied from said central processing unit or outside of the microcomputer; and a bus state controller for arbitrating competition between bus right requests supplied from said central processing unit, said direct memory access control unit and outside of the microcomputer and controlling a bus cycle for the outside, wherein said direct memory access control unit includes a first operation for, when a data transfer request is given from outside of the microcomputer with a data transfer set command for controlling the operation of said direct memory access control unit in a state in which said bus state controller has released a bus right to the outside of the microcomputer, performing data transfer control in accordance with the data transfer control information set by the data transfer set command, and wherein said direct memory access control unit includes a second operation for detecting after said first operation that a data transfer set command supplied together with a data transfer request from outside of the microcomputer is placed in a specific first state, to thereby perform data transfer control according to the set data transfer control information, using the same data transfer channel as that for said first operation, and a third operation for receiving a data transfer request from outside of the microcomputer without the delivery of a data transfer set command after said first operation to thereby perform data transfer control according to the set data transfer control information, using the same data transfer channel as that for the immediately preceding data transfer operation.

2. The microcomputer according to claim 1, wherein said data transfer control information includes address information indicating a transfer destination to transfer data and address information indicating a transfer source in which each data to be transferred is stored, to operate said direct memory access control unit.

3. The microcomputer comprising:

a central processing unit;

direct memory access control unit having a plurality of data transfer channels, for performing data transfer control based on data transfer control information supplied from said central processing unit or outside of the microcomputer; and a bus state controller for arbitrating competition between bus right requests supplied from said central processing unit, said direct memory access control unit and outside of the microcomputer and controlling a bus cycle for the outside, wherein said direct memory access control unit includes a first operation for, when a data transfer request is given from outside of the microcomputer with a data transfer set command for controlling the operation of said direct memory access control unit in a state in which said bus state controller has released a bus right to the outside of the microcomputer, performing data transfer control in accordance with the data transfer control information set by the data transfer set command, and wherein said direct memory access control unit includes a fourth operation for receiving a data transfer request from outside of the microcomputer with a data transfer set command after the data transfer control information is set by said central processing unit, to thereby perform data transfer control according to the data transfer control information set by said central processing unit, using a data transfer channel specified by the data transfer set command, and a fifth operation for receiving a data transfer request from said input/output device without the delivery of a data transfer set command after data transfer control information is set by said central processing unit, thereby performing data transfer control according to the set data transfer control information, using the same data transfer channel as that for the immediately preceding data transfer operation.

4. The microcomputer according to claim 3, wherein said data transfer control information includes address information indicating a transfer destination to transfer data and address information indicating a transfer source in which each data to be transferred is stored, to operate said direct memory access control unit.

* * * * *